United States Patent
Graves

(10) Patent No.: US 6,586,724 B2
(45) Date of Patent: Jul. 1, 2003

(54) CHROMATIC DISPERSION DISCRIMINATOR

(75) Inventor: Alan F. Graves, Kanata (CA)

(73) Assignee: Nortel Networks Limited (CA)

( * ) Notice: Subject to any disclaimer, the term of this patent is extended or adjusted under 35 U.S.C. 154(b) by 216 days.

(21) Appl. No.: 09/842,236

(22) Filed: Apr. 26, 2001

(65) Prior Publication Data

US 2002/0166956 A1 Nov. 14, 2002

(51) Int. Cl.[7] ............................................ G01N 21/25

(52) U.S. Cl. ........................... 250/227.23; 250/227.18; 356/351

(58) Field of Search ........................ 250/227.23, 227.18, 250/227.21, 226, 216; 356/351, 460, 341, 73.1; 359/124, 129, 247, 244

(56) References Cited

U.S. PATENT DOCUMENTS 5,642,195 A * 6/1997 Drachev et al. ............ 356/491

OTHER PUBLICATIONS

Eggleton, Benjamin J., *Dynamic dispersion compensation devices for high speed transmission systems.* 2000 Optical Society of America. pp. WH1–1 to WH1–3, OCIS codes: (060.2330) Fiber optics communications, 060.2360 Fiber optics links and subsystems.

Madsen, C.K., *Chromatic and Polarization Mode Dispersion Measurement Technique using Phase–Sensitive Sideband Detection.* 2000 Optical Society of America, pp. M06–1–1 to M06–3, OCIS codes: (060.0060) Fiber optics and optical communications, (130.3120) Integrated optics devices.

Strikant, V., *Broadband dispersion and dispersion slope compensation in high bit rate and ultra long haul systems.* 2000 Optical Society of America. pp. TuH1–1 to TuH1–3, OCIS codes: (000.0000) General.

Toshiaki, Okuno, O. Toshihiro, K. Takatoshi, Y. Yokoyama, M. Yoshida, Y. Takahashi, M. Yoshinori and M. Nishimura, *Optimum dispersion of non–zero dispersion shifted fiber for high rate DWDM systems.* 2000 Optical Society of America. pp. TuH4–1 to TuH4–3, OCIS codes: (060.2330) Fiber optics communications.

Anderson Ken E. and Kelvin H. Wagner, *Chromatic and Polarization Mode Dispersion Compensation Using Spectral Holography.* 2000 Optical Society of America. OFC pp. 1 to 3.

(List continued on next page.)

Primary Examiner—Que T. Le
(74) Attorney, Agent, or Firm—Steubing McGuinness & Manaras LLP

(57) ABSTRACT

A chromatic dispersion discriminator for determining the amount of chromatic dispersion in optical signals used by optical transmission systems is described. The discriminator provides a means of detecting the polarity and magnitude of dispersion in optical signals received over a dispersive optical link, thereby allowing the correct amount of dispersion compensation to be applied to each optical signal. The dispersion discriminator includes: a splitter for dividing the optical signal into at least first and second portions; a first dispersion leg for causing a first additional amount of dispersion in the first portion; a second dispersion leg for causing a second additional amount of dispersion in the second portion that is opposite in polarity and substantially equal in magnitude to the first additional amount such that the amount of dispersion in the second portion is detectably different from the amount of dispersion in the first portion; and a dispersion detector for receiving the first and second portions from the respective dispersion legs, determining the amount of dispersion in the optical signal by detecting a difference between the amount of dispersion in the first and second portions, and providing an indication of said amount of dispersion in the optical signal.

21 Claims, 20 Drawing Sheets

OTHER PUBLICATIONS

Yu Q. and Willner A.E., *Comparison of optical PMD compensation using a variable and fixed differential group delays*.2000 Optical Society of America (3 pages), OCIS codes: (060.2330) Fiber optics communications; (060.2360) Fiber optics links and subsystems.

Petersen M. N., Z. Pan, S. Lee, S. A. Havstad and A. E. Willner, *Dispersion monitoring and compensation using a single inband subcarrier tone*. 2000 Optical Society of America (3 pages), OCIS codes: (060.2330) Fiber optics communications; (060.2360) Fiber optics links and subsystems.

Karlsson, Magnus Chongjin Xie, Henrik Sunnerud, and Peter A. Andrekson, *Higher Order Polarization Mode Dispersion Compensator with Three Degrees of Freedom*. 2000 Optical Society of America (3 pages), OCIS codes: (060.0060) Fiber optics and optical communications; (260.2030) Dispersion; (260.5430) Polarization.

Le, Quan , Torben Veng and Lars Grüner–Nielsen , *New dispersion compensating module for compensation of dispersion and dispersion slope of non–zero dispersion fibres in the C–band*, 2001 Optical Society of America, pp. TuH5–1 to TuH5–3.

Shirasaki, M. and S. Cao, *Compensation of chromatic dispersion and dispersion slope using a virtually imaged phased array*, pp. TuS1–1 to TuS1–3.

Takenouchi, Hirokazu, Takashi Goh and Ishii Tetsuyoshi. *2×40–channel dispersion–slope compensator for 40–Gbit/s WDM transmission systems covering entire C–and L–bands*. 2000 Optical Society of America, pp. TuS2–1 to TuS2–3.

Pan, Z., Q. Yu, Y. Xie, S.A. Havstad, A.E. Willner, D.S. Starodubov and J. Feinberg, *Chromatic dispersion monitoring and automated compensation for NRZ and RZ data using clock regeneration and fading without adding signaling*. 2000 Optical Society of America (3 pages), OCIS codes: (060.2330) Fiber optics communications; (060.2360) Fiber optics links and subsystems.

Zhu, B., L. Leng, L. E. Nelson, S. Stulz, T.N. Nielsen, and D. A. Fishman, *Experimental Investigation of Dispersion Maps for 40 × 10 Gb/s Transmission over 1600 km of Fiber with 100–km Spans Employing Distributed Raman Amplification*.2000 Optical Society of America, pp. TuN3–1 to TuN3–3, OCIS codes: (060.2330) Fiber optics communications; (060.0060) Fiber optics and optical communication.

* cited by examiner

CHROMATIC DISPERSION DISCRIMINATOR

FIELD OF THE INVENTION

This invention relates to chromatic dispersion in optical systems, and more particularly to detection or discrimination of chromatic dispersion in optical signals used by optical transmission systems.

BACKGROUND OF THE INVENTION

Current optical fibers have a property known as chromatic dispersion which causes light transmitted along the fiber to experience an amount of propagation delay that is dependent on the frequency, or wavelength, of the light. Optical signals transmitted over these fibers by optical transmissions systems are modulated carrier signals which have a bandwidth determined by the upper and lower modulation sidebands. Different frequency components of an optical signal will experience different amounts of propagation delay, depending on the frequency (or wavelength) of the component, as the optical signal travels along the fiber. The resulting variance in propagation delays among the different frequency components changes the optical signal, thereby making error-free demodulation of the signal more difficult.

At a particular frequency, an optical fiber has a "null" point at which the propagation delay is minimum. Since dispersion is defined as the change in propagation delay relative to frequency (or wavelength), the dispersion at the null point will be zero and it will be opposite in polarity on either side of this point. The positive dispersion of one type of fiber can be used to approximately compensate for the negative dispersion of another type of fiber, and in this way optical links can be engineered to have minimal dispersion over a narrow frequency (or wavelength) range.

However, in dense wavelength division multiplexed (DWDM) systems, which typically have anywhere from 40 to 160 DWDM optical signals modulated on carriers spaced apart at 50–100 GHz and using optical carriers in the 1520–1580 nm range, engineering optical links to provide minimal dispersion for all of the DWDM optical signals is difficult, if at all possible, because of the wide range in frequency (or wavelength) of the signals. Typically, the amount of dispersion imparted on a group DWDM optical signals transmitted over an optical link will vary largely across the range of signals. When these DWDM signals are switched with optical signals from other optical links having different dispersion characteristics, the result is a new group of DWDM optical signals having an even wider, and now non-systematic variance in dispersion across the range of signals. This result is most prevalent in versions of automatically switched optical networks (ASON) which use purely photonic switches (as opposed to electro-optical switches and transponders) because the links over which optical signals travel between source and destination nodes in the network changes dynamically to adapt to changing traffic demands placed on the network.

Therefore, it would be desirable to have a means of detecting the amount of dispersion in optical signals received over a dispersive optical link or at least discriminating which polarity of chromatic dispersion is present, thereby allowing the correct amount of dispersion compensation to be applied to each optical signal, in either an open-loop (magnitude/polarity detection) or closed loop (residual polarity detection) application.

SUMMARY OF THE INVENTION

It is an object of the present invention to provide a chromatic dispersion discriminator for determining the amount of chromatic dispersion in optical signals.

The invention uses the chromatic dispersive properties of two or more different types of optical fibers in order to determine the polarity and magnitude of dispersion that a received optical signal has undergone as a result of being transmitted over one or more dispersive optical links.

Embodiments of the invention offer the advantage of allowing dispersion detection or discrimination to be performed on a per wavelength basis which is the first step to enabling compensation to be performed on individual optical signals on the basis of the amount of dispersion each optical carrier signal has undergone during transmission over an optical link, thereby allowing for more accurate dispersion compensation as compared to means employing engineered links which provide predetermined dispersion compensation.

According to an aspect of the present invention there is provided a dispersion discriminator for determining the amount of dispersion in an amplitude modulated optical signal. The amplitude modulated optical signal is a double side band signal produced from on-off, or quasi on-off, amplitude modulation used in conventional optical systems. The dispersion discriminator includes: a splitter for dividing the optical signal into at least first and second portions; a first dispersion leg for causing a first additional amount of dispersion in the first portion; a second dispersion leg for causing a second additional amount of dispersion in the second portion that is opposite in polarity and substantially equal in magnitude to the first additional amount such that the amount of dispersion in the second portion is detectably different from the amount of dispersion in the first portion; and a dispersion detector for receiving the first and second portions from the respective dispersion legs, determining the amount of dispersion in the optical signal by detecting a difference between the amount of dispersion in the received first and second portions, and providing an indication of said amount of dispersion in the optical signal.

Conveniently, the dispersion detector includes: a first spectrum detector for determining the power spectrum of the modulation sidebands of the received first portion; a second spectrum detector for determining the power spectrum of the modulation sidebands of the received second portion; and a dispersion processor for comparing the power spectra of the received first and second portions in order to determine the difference between the amount of dispersion in the first and second portions. Each spectrum detector includes an optical receiver combined with a scanning filter for determining the power spectrum of the respective portion of the optical signal provided to it.

Where a dispersion processor is provided, the dispersion processor may be operable to compare −3 dB cut-off frequencies of the power spectra (which results from the upper and lower sideband components at this frequency having been each shifted 45 degrees in opposite directions) in order to determine the difference between the amount of dispersion in the received first and second portions. Additionally, the dispersion processor may be further operable to compare notches and peaks in the power spectra in order to determine the difference between the amount of dispersion in the received first and second portions. In particular, theory indicates that a first strong or deep cancellation or notch with increasing modulation frequency will occur at a frequency equal to two times the −3 dB cut-off frequency (which results from the upper and lower sideband components at this frequency having been each shifted 90 degrees in opposite directions). At this point one leg of the discriminator should show a full, enhanced or attenuated but nonzero signal spectral density, whilst the other leg would show zero output, with a dispersed signal input, but both legs would show a "null" at the same point if the input signal had zero dispersion.

Where the dispersion detector includes spectrum detectors, each spectrum detector outputs a signal representing a normalized power spectrum of an optical input signal provided thereto. The optical input signal for the first spectrum detector is the first portion of the optical signal input into the dispersion discriminator after the first portion has been modified by the incremental dispersion of the first arm of the discriminator, and the optical input signal for the second spectrum detector is the second portion after it has been modified by the incremental dispersion of the second arm of the discriminator.

Where each spectrum detector outputs a signal representing a normalized power spectrum, the dispersion processor includes a comparator for providing a comparison of the signals representing the normalized power spectrum, and a spectrum-dispersion correlator for determining, from the comparison, the polarity and approximate magnitude of the dispersion in the optical signal. Each spectrum detector may include: an optical receiver for receiving the optical input signal by demodulating data carried in the optical input signal and outputting the demodulated data in an electrical signal; a scanning band-pass filter for selectively passing, in a filter output signal, a band of frequency components of the electrical signal provided thereto; a power measuring device for providing a measurement of the total power of the electrical signal; another power measuring device for providing a measurement of the power of the filter output signal; and a divider for dividing the measurements from the power measuring devices and outputting the signal representing the normalized power spectrum.

According to another aspect of the present invention there is provided a dispersion discriminator for determining the amount of dispersion in an amplitude modulated optical signal from two or more portions of the optical signal. The dispersion discriminator includes: a first dispersion leg for causing a first additional amount of dispersion in a first portion of the optical signal; a second dispersion leg for causing a second additional amount of dispersion in a second portion of the optical signal, the first and second additional amounts being opposite in polarity; and a dispersion detector for receiving the first and second portions from the respective dispersion legs, determining the amount of dispersion in the optical signal by detecting a difference between the amount of dispersion in the received first and second portions, and providing an indication of said amount of dispersion in the optical signal.

The dispersion detector may be further operable to receive a third portion of the optical signal and compare the received first portion relative to the received third portion with the received second portion relative to the received third portion in detecting said difference. In such a case, the dispersion detector includes: a first spectrum detector for determining the power spectrum of the received first portion; a second spectrum detector for determining the power spectrum of the received second portion; a third spectrum detector for determining the power spectrum of the received third portion; and a dispersion processor. The dispersion processor is operable to: determine a first relative power spectrum that is the power spectrum of the received first portion relative to the power spectrum of the received third portion; determine a second relative power spectrum that is the power spectrum of the received second portion relative to the power spectrum of the received third portion; and compare the first and second relative power spectra in determining the difference between the amount of dispersion in the received first and second portions.

According to still another aspect of the present invention there is provided a dispersion discriminator for determining the polarity and magnitude of dispersion in an amplitude modulated optical signal. The dispersion discriminator comprises: an input port for receiving the optical signal; an output port for transmitting an output signal indicating the polarity and magnitude of dispersion in the optical signal; a splitter having an input coupled to the input port and having at least two outputs, the splitter operable to divide the optical signal into at least first and second portions; a positive dispersion leg having two ends, one of which is coupled to one output of the splitter, the positive dispersion leg being operable to add an amount of positive dispersion to the first portion; a negative dispersion leg having two ends, one of which is coupled to the other output of the splitter, the negative dispersion leg being operable to add an amount of negative dispersion to the second portion; and a dispersion detector having an output coupled to the output port and having two inputs, each input coupled to a respective other end of the positive and negative dispersion legs, the dispersion detector being operable to determine the polarity and magnitude of dispersion in the optical signal by comparing the first and second portions received from the first and second dispersion legs and to transmit an indication of the polarity and magnitude of dispersion in the optical signal via the output signal.

Other aspects of the invention include combinations and sub combinations of the features described above other than the combinations described above.

BRIEF DESCRIPTION OF THE DRAWINGS

The invention will be further understood from the following detailed description of embodiments of the invention with reference to the accompanying drawings, in which.

DETAILED DESCRIPTION

Figure 1:
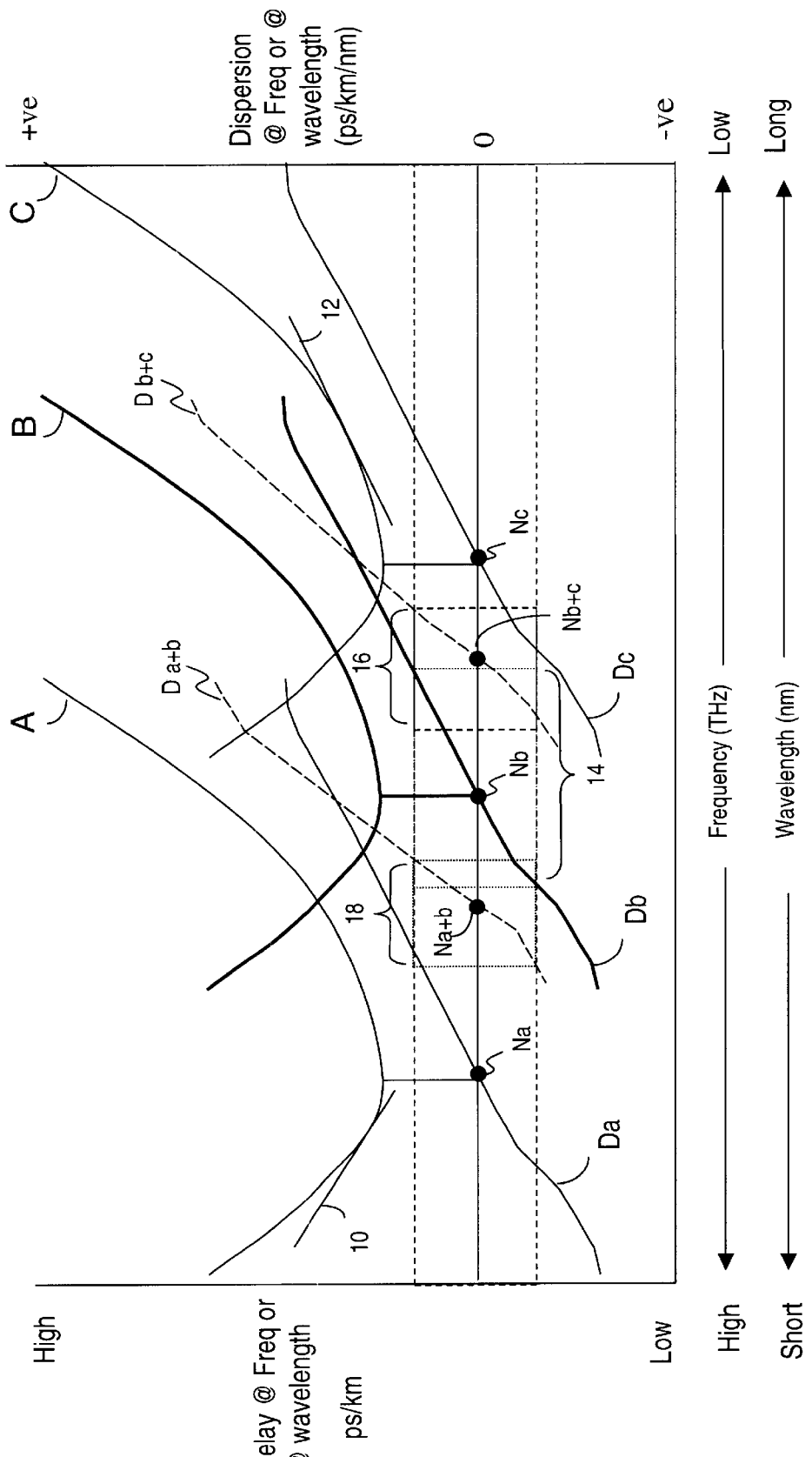
FIG. 1 is a graph showing dispersive properties of three different types of fibers and links composed of these fiber types.

Optical fiber provides a maximum velocity of propagation for light at only one band of wavelengths, and at other wavelengths above and below this band it shows a slightly lower velocity of propagation. This manifests itself as a delay through a long optical fiber path that is related to the optical carrier frequency or wavelength. The point at which maximum velocity is achieved can be moved by changing the design of the fiber or its material system, but the same basic generic shape is usually followed. Delay, per se, is not a problem. However, the fact that the delay has a frequency/wavelength-sensitive component is a problem because, for any given optical carrier that is modulated with data, it will contain information-related side-bands at slightly different optical frequencies. For example, a 10 GHz wide modulation signal on a 194 THz optical carrier will have components at 193.99–194.01 THz, or from 193,990 GHz to 194,010 GHz. Since the data is amplitude modulated on to the optical carrier (usually in a quasi-on/off mode) the modulated carrier will exhibit two side-bands, namely, an upper and a lower side-band. If the delay varies across the frequencies occupied by this modulated carrier then the upper side-band will propagate at a slightly different speed to the carrier and the lower side-band will exhibit an equal but opposite effect. This can give rise to destructive interference or cancellation of some of the sideband components at the receiver, if the phase shift of those components approaches 90 degrees. The slope of the delay with wavelength or frequency (i.e. the differential of the delay with frequency or wavelength) is known as chromatic dispersion and is expressed in units of time by units of wavelength or frequency (e.g. ps/nm or ps/GHz). Since chromatic dispersion is usually linearly additive along a fiber, the measure of fiber dispersion is usually normalized to a standard length, e.g. 1 km in which case the fiber dispersion performance would be expressed as ps/nm-km or ps/GHz-km. Both forms of expressing dispersion are valid but one results in the dispersion having approximately $1/130^{th}$–$1/140^{th}$ of the numeric value and the opposite sign (since wavelength is inversely proportional to frequency).

Conventionally, dispersion is specified relative to optical carrier wavelength, but when dealing with information side-bands from known bit-rate modulation it is more convenient to use optical carrier frequencies. Specifying dispersion relative to frequency also matches the specification of the International Telecommunication Union (ITU) DWDM grid, which is on a frequency plan with 100 GHz increments. Hereinafter, either frequency relative dispersion or wavelength relative dispersion figures will be used according to which type of dispersion figure simplifies the explanation of the invention.

For any given type of optical fiber there is a "null" point at a given frequency, depending on the dispersive properties of the fiber, where the delay is a minimum and hence the dispersion is zero. The amounts of dispersion on either side of this null point are opposite in polarity. Different fibers have different zero dispersion "null" points and hence have different dispersion values at any given wavelength. The slope of the dispersion characteristics is always positive and is just left-shifted or right shifted. Also, longer fiber paths will show a proportionally greater slope as well as a greater absolute value of dispersion.

FIG. 1 shows three propagation delay curves characteristics, A, B, and C of delay versus optical wavelength or frequency for three different types of fiber, each having a different dispersion characteristic, and their corresponding dispersion curves Da, Db, and Dc, dispersion being defined as the rate of change of propagation delay with optical frequency or wavelength. A line 10 shows the slope of a portion of the first delay curve A in which the dispersion is positive relative to increasing carrier frequency. Positive dispersion means that higher frequency signals propagate slower than the lower frequency signals and hence become phase-delayed. Another line 12 shows the slope of a portion of the third delay curve C in which the dispersion is negative relative to increasing carrier frequency. Negative dispersion means that higher frequencies signals propagate faster than lower frequencies signals and hence become phase-advanced. The respective null points for the dispersion curves Da, Db, and Dc are the frequencies where dispersion is zero and are shown as points Na, Nb, and Nc.

The second dispersion curve Db shows dispersion from a fiber that is part of a transmission link. Overlaid on this curve Db is an arbitrary "low dispersion" window 14, over which an arbitrary transmission system would perform well. By adding a compensating length of fiber having a dispersion characteristic matching the third dispersion curve Dc in the central office (CO) and in series with the transmission link fiber, it is possible to shift up in wavelength (down in frequency) the band of received wavelengths over which the arbitrary transmission system would work. However, this shift is done with the penalty of reducing the width of the original "low dispersion" window 14 (since the optical path is now significantly longer), resulting in the new dispersion window 16 for the fourth dispersion curve Db+c, which has a new point Nb+c of zero dispersion. A similar but opposite effect can be achieved by instead using a third fiber having a dispersion characteristic matching the first dispersion curve Da, which would result in another window 18 of low dispersion and a fifth dispersion curve Da+b, which has a new point Na+b of zero dispersion. This dispersion compensation technique can be used to make a transmission system operating across the entire three windows of low dispersion (14, 16, 18) by first demultiplexing a received DWDM signal into groups of carriers, each group falling within a particular low dispersion window, and then passing the signals of each group through a length of fiber that provides adequate dispersion compensation for the signals in that group. Alternatively the fiber transmission path itself can be composed of a concatenated mixture of fiber types, using fibers of dispersion values that compensate, or partially compensate, for each other.

Figure 2:
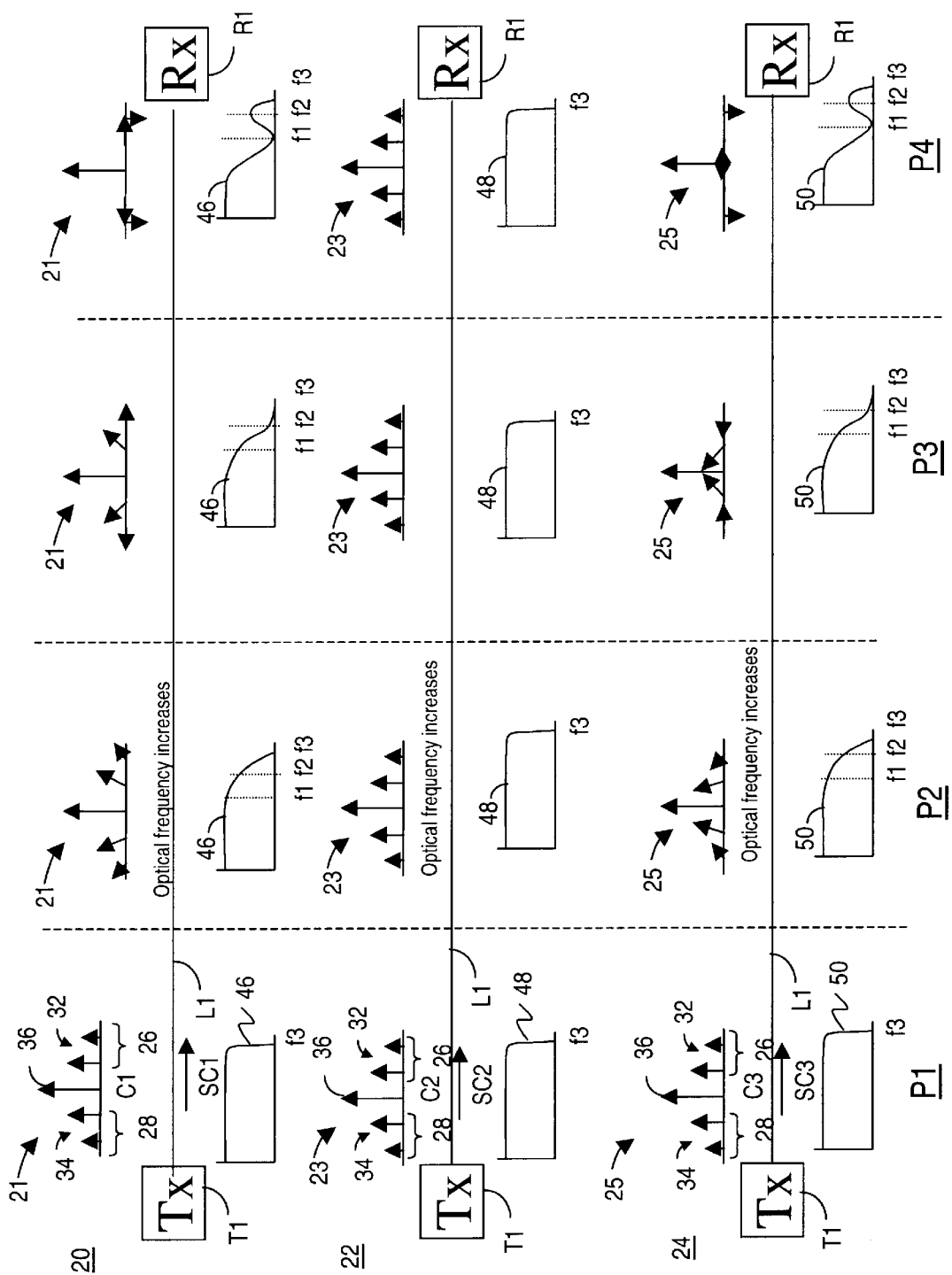
FIG. 2 is a diagram showing the effects of dispersion on the transmission of optical signals for three different cases: negative dispersion, zero dispersion, and positive dispersion.
Figure 2A:
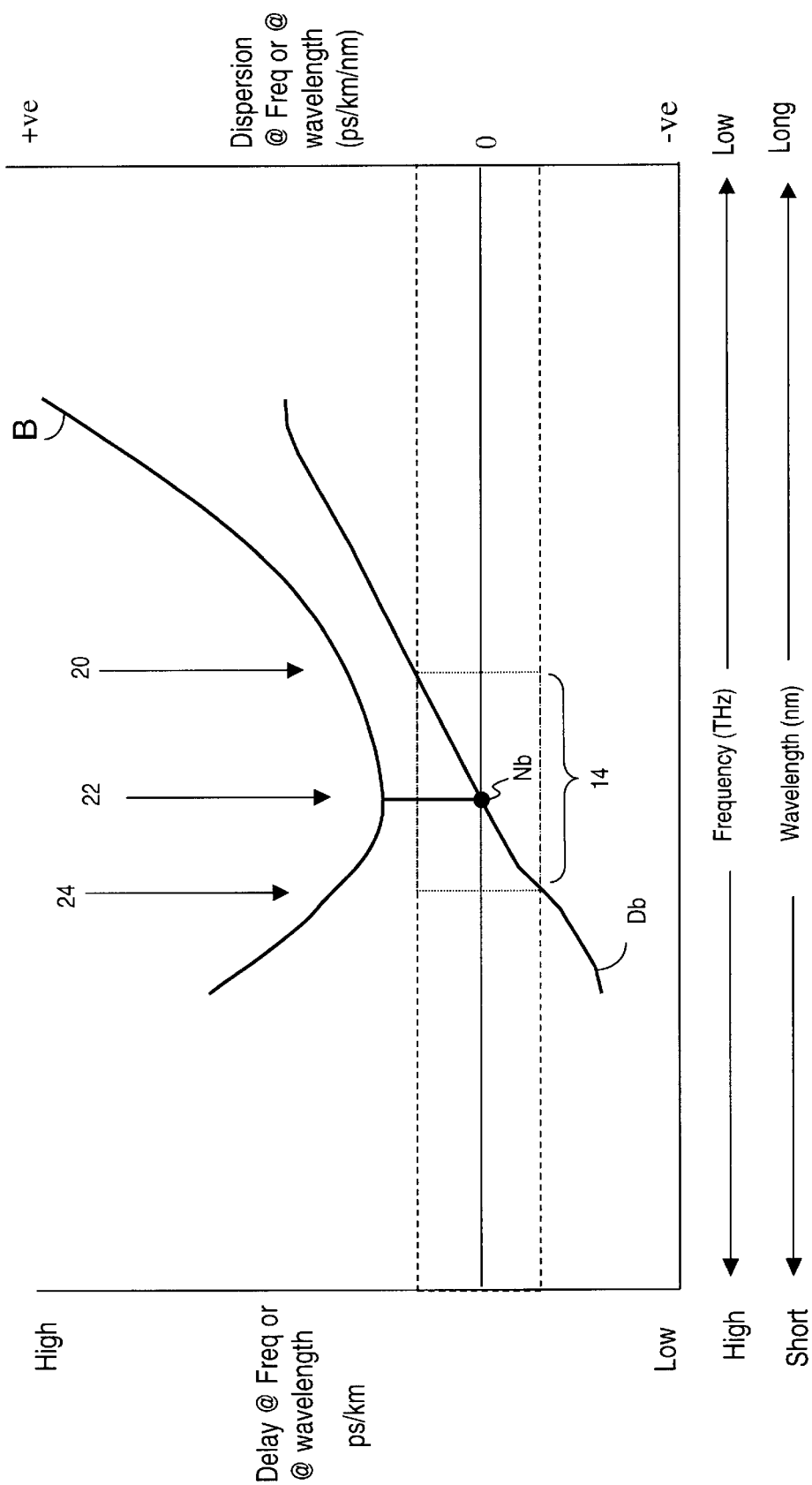
FIG. 2a displays the central dispersion curve of FIG. 1 and shows the locations along this curve that the three cases of dispersion in FIG. 2 occur.

Referring to FIGS. 2 and 2a the effects of dispersion on the transmission of optical signals will now be explained. FIG. 2 shows the effects of dispersion on the transmission of optical signals for three different cases: negative dispersion 20, zero dispersion 22, and positive dispersion 24. FIG. 2a shows the relationship between the responses for positive 24, negative 20 and null dispersion 22 and where such responses would occur, on a normal fiber propagation delay or dispersion plot. In each case an optical signal SC1, SC2, SC3 is transmitted from an optical transmitter T1 over a dispersive optical transmission link L1 and received by an optical receiver R1. However, the frequency of the optical carrier C1, C2, C3 is different from one case to another such that the dispersion the optical signals undergo as they propagate along the transmission link L1 is different in each case. A phase-amplitude diagram 21, 23, 25 of the amplitude and phase relationship of the side-band and carrier components of each signal and a power spectrum diagram 46, 48, 50 after normal envelope detection of each signal is provided for each case at four different points (P1, P2, P3, and P4) along the link L1. In the phase-amplitude diagrams an arrow rotation from the vertical represents a phase shift at a particular modulation side-band frequency and the distance from the center optical carrier arrow to the base of the sideband arrow is representative of the modulation frequency. Hence higher modulation frequencies are further from the central optical carrier arrow. The modulation format is assumed to be standard Amplitude Shift Key, where a "one" represents a "high" and "zero" represents a "low", as is normal in Fiber Optic Systems, and which produces a symmetrical double sideband signal, though the results are true for any double sideband signal and hence could be applied to QAM-type signals (but not VSB analog TV signals).

Referring to the zero dispersion case 22, an amplitude modulated communication signal transmitted optically will have upper 26 and lower 28 side-band components containing the actual information and spreading out over several harmonics f1, f2, f3 of the data rate on either side of the optical carrier C2. In a system having zero dispersion, these sidebands (26, 28) will maintain their time-relationships to each other as shown by arrows 32, 34, 36 which represent the amplitude and relative phase of the upper side band components 26, lower side band components 28, and carrier components C2, respectively.

Referring to the positive dispersion case 24, the upper side-band 26 is propagated more slowly than the carrier C3 and so the upper side-band components, represented by the arrows 32, become progressively more phase-lagged relative to the carrier C3, with both increasing fiber path length and increasing sideband modulation frequency (which results in a larger difference in the sideband optical frequency and the optical carrier frequency). Accordingly, the arrows 32 representing the upper side-band components are shown rotated anti-clockwise, representing a phase lag, resulting in their rotating towards the carrier C3. At the same time, the lower side-band 28 is propagated more quickly than the carrier C3 and so the lower side-band components, represented by the arrows 34, become phase-advanced relative to the carrier C3, resulting in their phase vector becoming advanced, which is shown by clockwise rotation. Accordingly, the arrows 34 representing in the lower side-band components are shown rotated towards the carrier C3. This phase shifting effect is proportional to the difference in frequency that separates the individual side-bands from the optical carrier and is proportional to the amount of dispersion on the link (i.e. the transmission distance in a uniform dispersive fiber). When the phase shift of the higher harmonic f2 components of the side-bands 26, 28 has reached 90 degrees, as shown at point P3, they will completely cancel out each other in the double side-band spectrum detector used in a typical optical receiver. The result is that the information carried by these harmonics f2 in the side-bands 26, 28 will be lost. At longer lengths these higher harmonic f2 components are shifted by more than 90 degrees, and when they reach 180 degrees, as shown in at point P4, they again fully constructively add in the detection process in the receiver R1, but are inverted in polarity, relative to the lower harmonic f1 components of the signal. However, if the highest frequency components are rotated 180 degrees then the frequency components half way to the upper frequency are rotated 90 degrees and therefore cancel each other out, creating a broad notch at the harmonic f1 in the received signal, rendering it useless. The onset of problems occurs with less than a 90 degree phase shift of the higher harmonic f2 components, since even a 45 degree phase shift is enough to reduce the amplitude of these components by 3 dB, as shown at point P2.

Referring to the negative dispersion case 20, the power spectrum diagram 46 is the same at each of the points (P1, P2, P3, P4) along the link L1 as that of the positive dispersion case 24, however this results from an opposite effect of dispersion as can be observed from the phase-amplitude diagram 21, which shows the upper and lower side-band components rotated away from the carrier C1.

Figure 3:
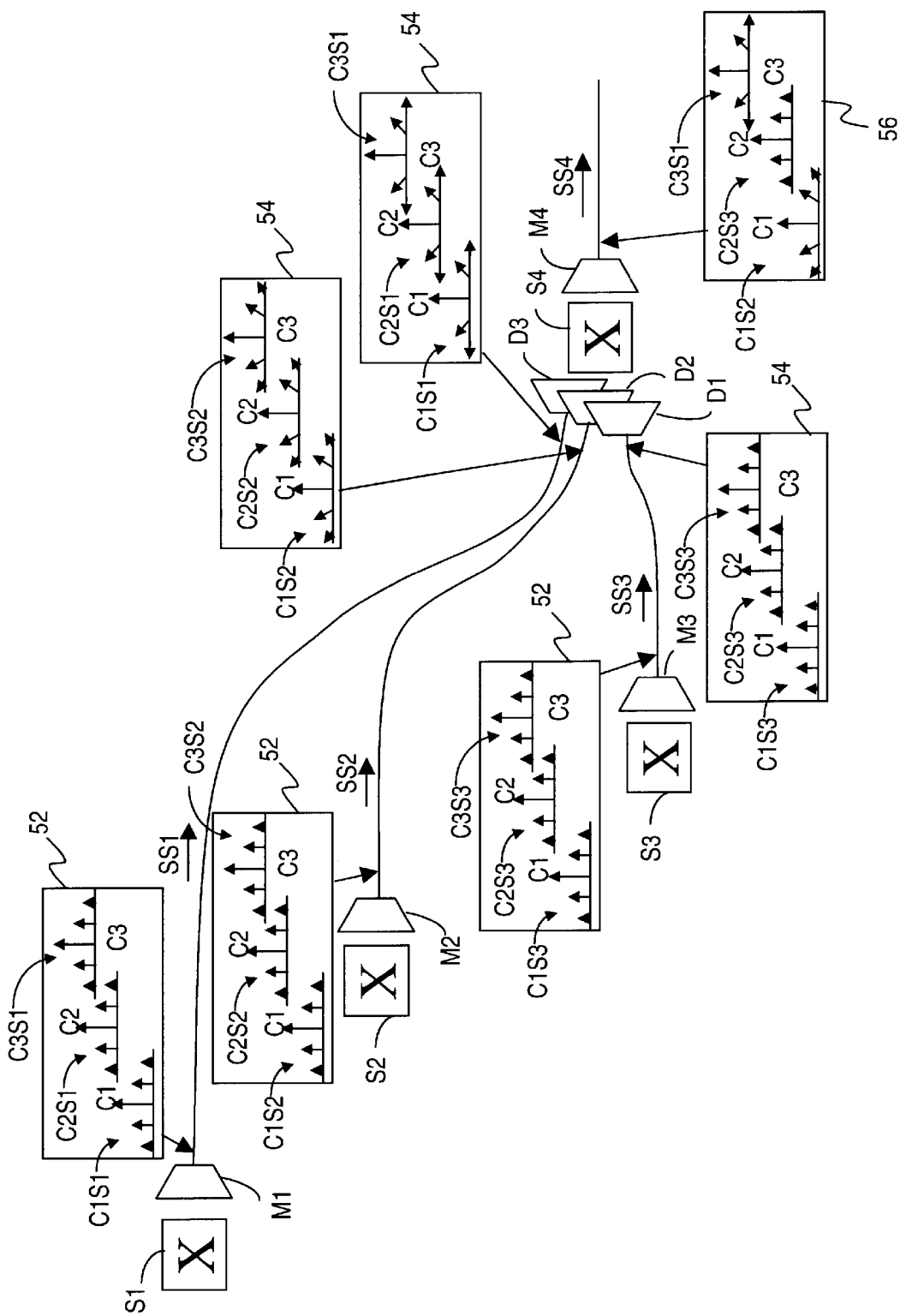
FIG. 3 is a schematic diagram showing how adjacent wavelengths in an output DWDM stream from a photonically interconnected node may have completely different ancestries and hence dispersion impairments.

FIG. 3 shows how adjacent wavelengths in an output DWDM stream may have completely different ancestries and hence impairments. Consequently, either broadband lambda-by-lambda compensators need to be strategically placed throughout the network, or dispersion must be compensated on a node-by-node basis.

FIG. 3 shows three switches S1, S2, S3, which have respective multiplexers M1, M2, M3 that each multiplex three DWDM signals of different carrier frequencies C1, C2, C3 into a single DWDM stream SS1, SS2, SS3 and transmit them to another switch S4. Phase-amplitude diagrams 52 for each DWDM signal immediately after transmission onto a transmission link connected to the switch S4 are shown in the figure. Each of the links has a different dispersion characteristic, hence the DWDM streams SS1, SS2, SS3 undergo different amounts of dispersion while propagating along their respective links. The signals in the stream SS1 output by the switch S1 are C1S1, C2S1, and C3S1; the signals in the stream SS2 output by the switch S2 are C1S2, C2S2, and C3S2; and the signals in the stream SS3 output by the switch S3 are C1S3, C2S3, and C3S3. The switch S4 has three demultiplexers D1, D2, D3, each of which receives one of the streams and demultiplexes into its constituent DWDM signals. As shown by the phase-amplitude diagrams 54 at the end of the links, the DWDM signals received by the demultiplexer D1 have undergone no chromatic dispersion, while the signals received by the demultiplexer D2 have undergone some positive dispersion, and the signals received at the demultiplexer D3 have undergone even more positive dispersion. After the signals have been routed by the switch S4 a multiplexer M4 combines the DWDM signals C1S2, C2S3, and C3S1 into an output DWDM stream SS4. As shown by the phase-amplitude diagram 56 at the output of the multiplexer M4, the resulting output stream SS4 includes three DWDM signals each with a different amount of dispersion, and consequently requiring a different amount of dispersion compensation.

Figure 4:
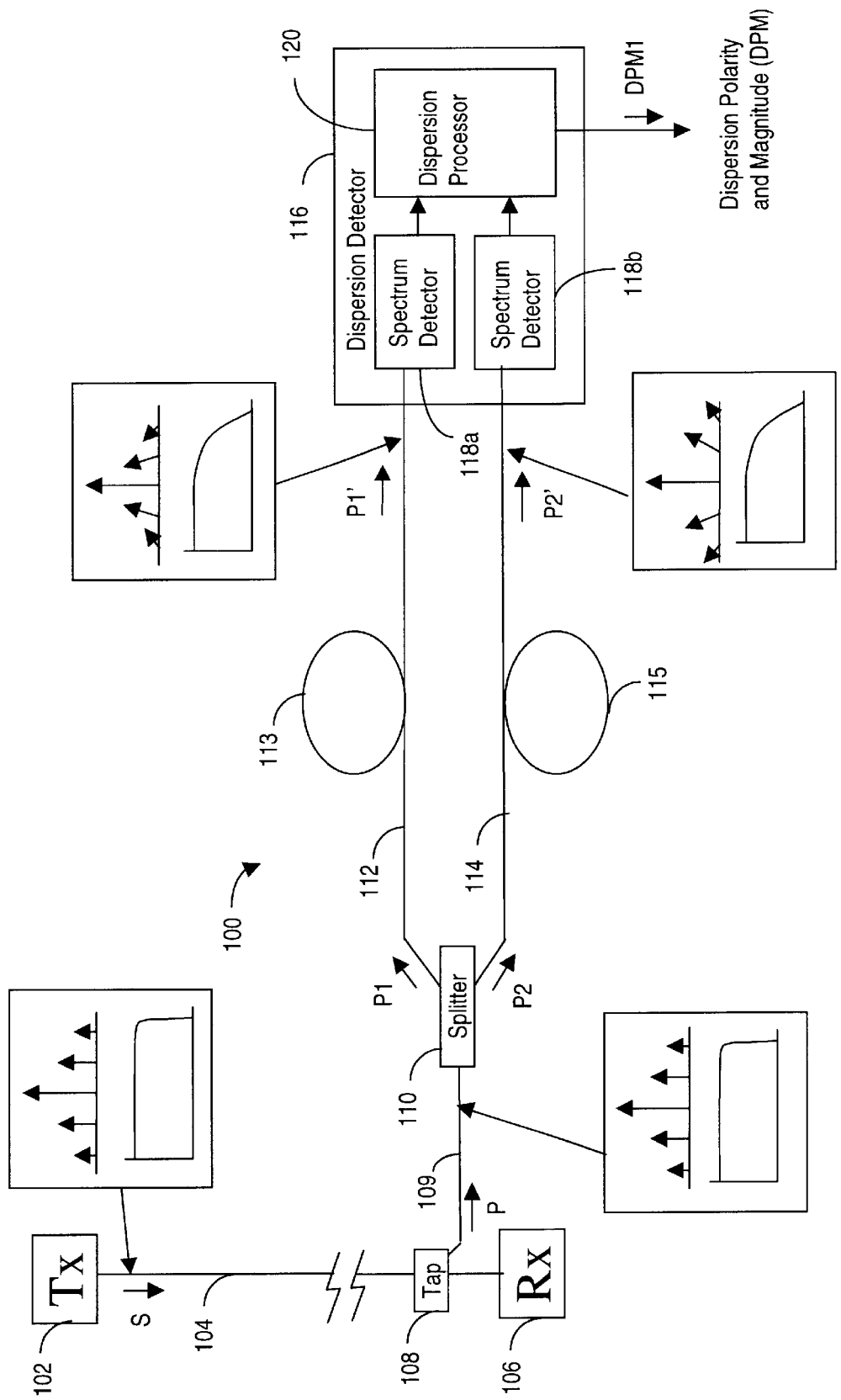
FIG. 4 is a high-level block diagram of a dispersion discriminator in accordance with a first embodiment of the invention.

FIG. 4 shows, in a high-level block diagram, a dispersion discriminator 100 in accordance with a first embodiment of the invention. The dispersion discriminator or 100 is coupled to part of an optical transmission system (102, 104, 108, 106) and measures the dispersion along that system. In this case, an optical transmitter 102 transmits an optical signal S over a zero dispersion transmission path 104 which is terminated by an optical receiver 106. An optical tap 108 coupled to the link 106 taps a portion P of the signal S and routes this portion P over a short optical fiber 109 to the dispersion discriminator 100, which operates by dividing the signal into two equal portions and adding additional dispersion, ideally of equal but opposite sign, to each of the portions. The portion P is received by the discriminator 100 which includes an optical splitter 110 coupled to the fiber 109 at its input and to one end of a positive dispersion leg 112 at one of its outputs and to one end of a negative dispersion leg 114 at its other output. The splitter 110 divides the signal P into two portions represented by signals P1 and P2. The signal P1 traverses the positive dispersion leg 112, which comprises a coil of fiber 113, which exhibits positive dispersion at the optical frequency/wavelength of interest, and the signal P2 traverses the negative dispersion leg 114, which comprises a coil of fiber 115, which exhibits positive dispersion at the optical frequency/wavelength of interest. The two signals P1 and P2 are received by a dispersion detector 116 that is coupled to the positive 112 and negative 114 dispersion legs at their other ends. Thus the discriminator 100 is able to determine the phase shift of the signal S after propagating along the transmission link 104 by adding a small amount of positive and negative dispersion to parts P1 and P2 of the signal S, via the positive 112 and negative 114 dispersion legs, and examining the impact on the signals P1' and P2' received at the dispersion detector 116.

The discriminator 100 operates by tapping a portion P of the optical signal S to be assessed and passing that portion P through more dispersive elements (e.g. positive and negative dispersion legs 112 and 114). The tapped portion P of the signal that has undergone dispersion is split into two parts P1 and P2, one part P1 of which is passed down a length of "positive" dispersion fiber 113, and the other part P2 is passed down a length of "negative" dispersion fiber 115 of approximately equal but opposite dispersion value. The signals P1' and P2' at the ends of these fibers are then analyzed by passing them through two conventional spectrum detectors 118a and 118b coupled to the legs 112, 114. A processor 120 coupled to the detectors 118a, 118b analyzes the respective signals E1, E2 from the detectors 118a, 118b, determines the polarity and magnitude of dispersion in the signal S and outputs the resulting determination in a dispersion polarity and magnitude (DPM) output signal DPM1. The output signal DPM1 gives an indication of polarity and magnitude of dispersion in the optical signal input to the dispersion discriminator, and this indication can be used by a dispersion compensator for compensating the dispersion. In a "balanced" (i.e. no transmission dispersion) case these two detectors 118a and 118b will show nominally identical outputs. However, if the signal S has undergone dispersion from propagating along the transmission link 104, the detector 118a or 118b on the discriminator leg 112, 114 with the same dispersion polarity will show a signal degradation (i.e. increased high frequency loss) whilst the detector 118a or 118b on the other leg 114, 112 will show a relative improvement. In a balanced zero dispersion case as shown in FIG. 4, the discriminator will show a high frequency roll-off due to its internal dispersion, necessary for the discriminator to work, at W GHz, where W is derived from the following mathematical calculations.

For the positive dispersion leg:

F (−3 dB)=frequency at which spectral line in modulation has rotated 45 degrees or ⅛ of complete cycle at the modulation frequency.

For "y" km of "z" ns/km-GHz dispersion fiber in the discriminator this is equal to a frequency of "W" GHz where:

1) Dispersive delay=y·z·W ns at frequency W
2) For 45 degree phase shift @ W GHz the delay=0.125 cycle or 0.125/W (ns)
3) This results in the equation, $$|y*z*W|=0.125/W \text{ or } W2=0.125/|y*z| \text{ or } W=(0.125/|y*z|)^{1/2} \quad \text{EQ. 1}$$

If the units of dispersion are ps/GHz-km then EQ. 1 modifies to:

$$W=(125/|y*z|)^{1/2} \quad \text{EQ.2}$$

For the negative dispersion leg:

F (−3 dB)=frequency at which spectral line in modulation has rotated 45 degrees or ⅛ of complete cycle at the modulation frequency.

For "y" km of "−z" ns/km-GHz dispersion fiber in the discriminator this is equal to a frequency of "W" GHz where:

1) Dispersive delay=y·(−z)·W ns at frequency W
2) For 45 degree phase shift @ W GHz the delay=0.125 cycle or 0.125/W (ns)
3) This results in the equation, $$|y*z*W|=0.125/W$$

or $$W2=0.125/|y*z|$$

or $$W=(0.125/|y*z|)^{1/2} \quad \text{EQ.3}$$

If the units of dispersion are ps/GHz-km then this modifies to:

$$W=(125/|y*z|)^{1/2} \quad \text{EQ.4}$$

Figure 4A:
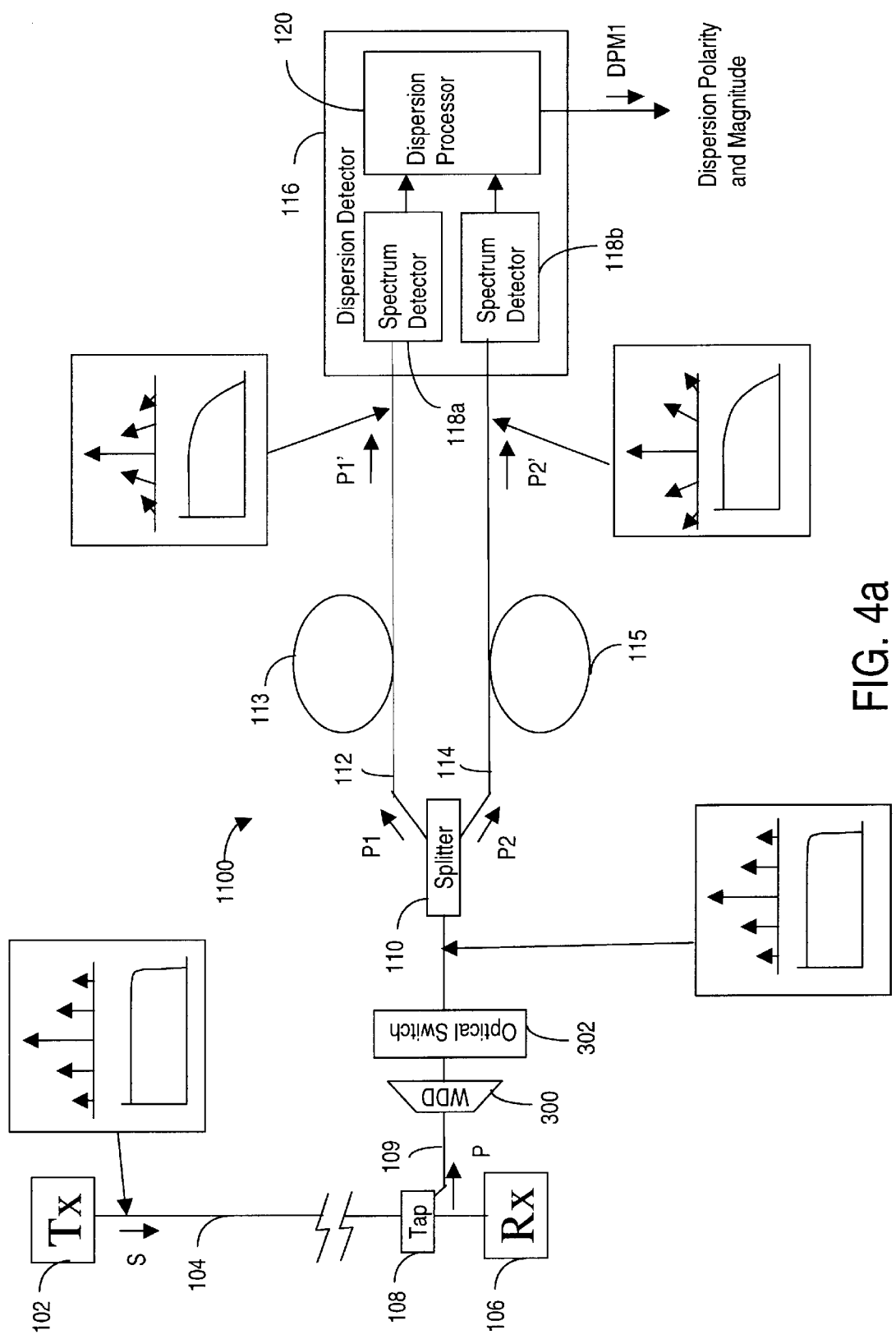
FIG. 4a is a high-level block diagram of a dispersion discriminator in accordance with a second embodiment of the invention.

FIG. 4a is a high-level block diagram of a dispersion discriminator 1100 in accordance with a second embodiment of the invention. The dispersion discriminator 1100 includes a wavelength division demultiplexer (WDD) 300 in series with an optical switch 302. The series-connected demultiplexer 300 and switch 302 are coupled between the optical tap 108 and the optical splitter 110, and are used for selecting an optical signal that has a carrier wavelength in the operating range of the dispersion discriminator 1100. The operating range of the dispersion discriminator is defined as the range of carrier wavelengths for which the positive 112 and negative 114 dispersion legs add an additional amount of dispersion that are opposite in polarity and substantially equal in magnitude to their respective portions of the selected optical signal. The degree to which the additional amounts are equal, that is, regarding the term "substantially equal", depends on the sensitivity of the dispersion detector 116 and the desired sensitivity of the dispersion discriminator 1100 itself. As will be explained later in more detail with reference to FIGS. 8 and 9, the degree of inequality in the magnitude of the additional amounts of dispersion subtracts from the sensitivity of the dispersion detector. For example, where the dispersion detector has a sensitivity of 5–10%, and the inequality in magnitude of additional dispersion of the dispersion legs 112, 114 is 2%, the overall sensitivity of the dispersion discriminator 110 would be in the range of 7–12% (i.e. the inequality lessens the overall sensitivity of the dispersion discriminator). Obviously, the term "substantially equal" is relative to desired performance of the dispersion discriminator. However, acceptable inequality in the magnitude of the additional amount of dispersion of the positive 112 and negative 114 dispersion legs does not extend to the point in which the difference in dispersion between the respective portions of the selected optical signal is no longer detectable.

The spectrum detectors 118a, 118b make use of simple receivers in which the upper and lower sidebands are combined to produce a "vertical magnitude" of the individual upper/lower sideband components. Under such circumstances the spectrum detectors 118a, 118b can not and do not show a different output for the same amount of positive or negative dispersion, though they show a different output for different amounts of dispersion. Hence the spectrum detectors 118a, 118b include simple magnitude detectors, the simplest version of which is a P-I-N diode receiver.

Figure 5:
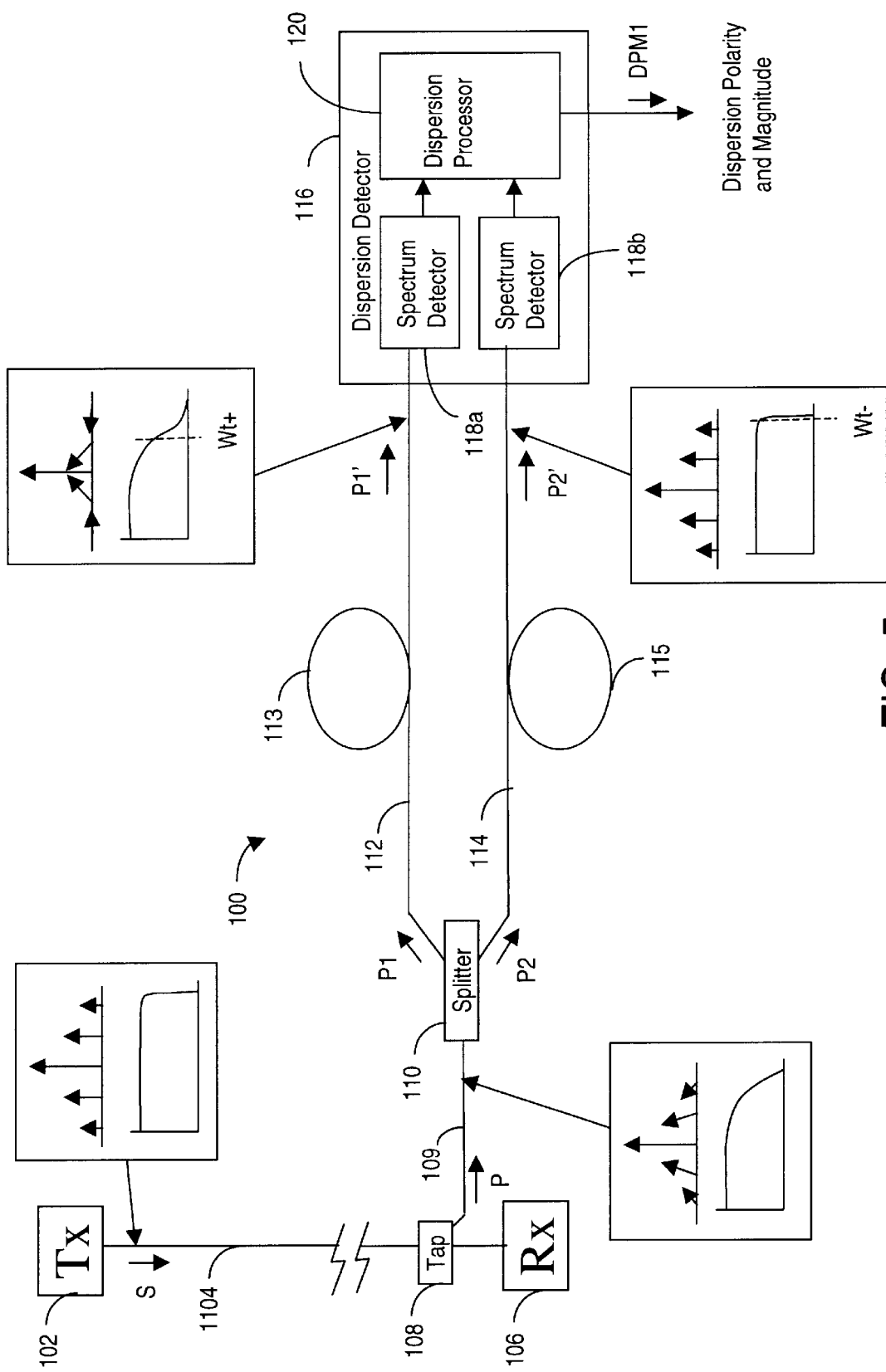
FIG. 5 depicts the operation of the dispersion discriminator of FIG. 4 on an input signal having a moderate amount of positive dispersion.

Referring to FIG. 5, the operation of the dispersion discriminator 100 of FIG. 4 on an input signal to be measured from the optical link (102, 1104, 108, 106) and having moderate positive dispersion is shown. The signal S is transmitted from the transmitter 102 along a positive dispersion transmission link 1104, which terminates at the receiver 106. When an optical signal has been transmitted via a dispersive path with "positive" dispersion, then the discriminator 100 becomes unbalanced, with one arm adding incremental dispersion, and resulting in greater degradation, and the other arm partially or even totally compensating the incoming dispersion and hence exhibiting relatively less degradation. This effect can be observed from the phase-amplitude and power spectrum diagrams for the signals P1' and P2' received by the dispersion and detector 116. The phase distortion present on the signal P at the input of the dispersion discriminator is added to by the dispersion in the positive leg 112 and subtracted from by the dispersion in the negative leg 114. This addition has the effect that the signal P1' on the positive leg 112 has a −3 dB cut-off point, $Wt_+$, that falls in frequency as the input dispersion rises. The subtraction on the negative dispersion leg 114 has the effect that the signal P2' on this leg 114 has a −3 dB cut-off point, $Wt_-$, that rises until the dispersion on the input signal P is equal but opposite to the dispersion of the negative dispersion leg 114. As the dispersion on the input signal P continues to rise further, the −3 dB cut-off point $Wt_-$ falls, but always remaining above −3 dB cut-off point $Wt_+$ of the positive leg 112.

Since the input signal spectrum of the modulation sidebands is not known, the polarity of the dispersion of the input signal P is achieved by comparing the two signals P1' and P2' received at the dispersion detector 116 to determined which one exhibits the greater bandwidth. This determination can be done by comparing the high-frequency components of the signals P1' and P2'. Alternatively, as we will be described later, a third, nominally zero dispersion leg can be added to the discriminator 100. This will reinforce the discriminator's 100 ability to not only discriminate dispersion polarity, but also to measure dispersion magnitude unambiguously.

In FIG. 5 the negative dispersion leg 114 introduces opposite and equal dispersion in the signal P2 resulting in the signal P2' having sidebands that are phase-aligned to the carrier. This phase-alignment can be observed from the phase-amplitude diagram for the signal P2'. Normally, this phase-aligned condition would not be the case. Instead, the transmission link 1104 would have a much higher dispersion than the relatively short coil of fiber 115 in the negative dispersion leg 114.

For the positive dispersion leg:

F (−3 dB)=frequency at which spectral line in modulation has rotated 45 degree or ⅛ of complete cycle at modulation frequency.

For "y" km of "z" ns/km-GHz dispersion fiber in the discriminator concatenated with "Y" km of "Z" ns per km per GHz fiber this is equal to a frequency of "$Wt_+$" GHz where:

1) Dispersive delay=$\{(Y^*Z)+(y^*z)\}^*Wt_+$ (ns) at frequency=$Wt_+$

2) For 45° phase shift @ $Wt_+$GHz the delay=0.125 cycle or 0.125/W (ns)

3) This results in the equation, $$|\{(Y^*Z)+(y^*z)\}^*Wt_+|=0.125/Wt_+ \text{ or } Wt_+2=0.125/|\{(Y^*Z)+(y^*z)\}| \text{ or }$$
$$Wt_+=(0.125/|\{(Y^*Z)+(y^*z)\}^*|)^{1/2} \qquad \text{EQ. 5}$$

If the units of measure for the dispersion are ps per GHz-km then this modifies to:

$$Wt_+=(125/|\{(Y^*Z)+(y^*z)\}^*|)^{1/2} \qquad \text{EQ. 6}$$

For the negative dispersion leg:

F (−3 dB)=frequency at which spectral line in modulation has rotated 45 degrees or ⅛ of complete cycle at modulation frequency.

For "y" km of "−z" ns/km-GHz dispersion fiber in the discriminator concatenated with "Y" km of "Z" ns per km per GHz fiber this is equal to a frequency of "$Wt_-$" GHz where:

1) Dispersive delay=$\{(Y^*Z)-(y^*z)\}^*W$ (ns) at frequency $Wt_-$

2) For 45° phase shift @ $Wt_-$ GHz the delay=0.125 cycle or 0.125/$Wt_-$ (ns)

3) This results in the equation, $$|\{(Y^*Z)-(y^*z)\}^* Wt_-|=0.125/Wt_- \text{ or } Wt_-2=0.125/|\{(Y^*Z)-(y^*z)\}| \text{ or }$$
$$Wt_-=(0.125/|\{(Y^*Z)-(y^*z)\}^*|)^{1/2} \qquad \text{EQ. 7}$$

If the units of measure for the dispersion are ps per GHz-km then this modifies to:

$$Wt_-=(125/|\{(Y^*Z)-(y^*z)\}^*|)^{1/2} \qquad \text{EQ. 8}$$

Figure 6:
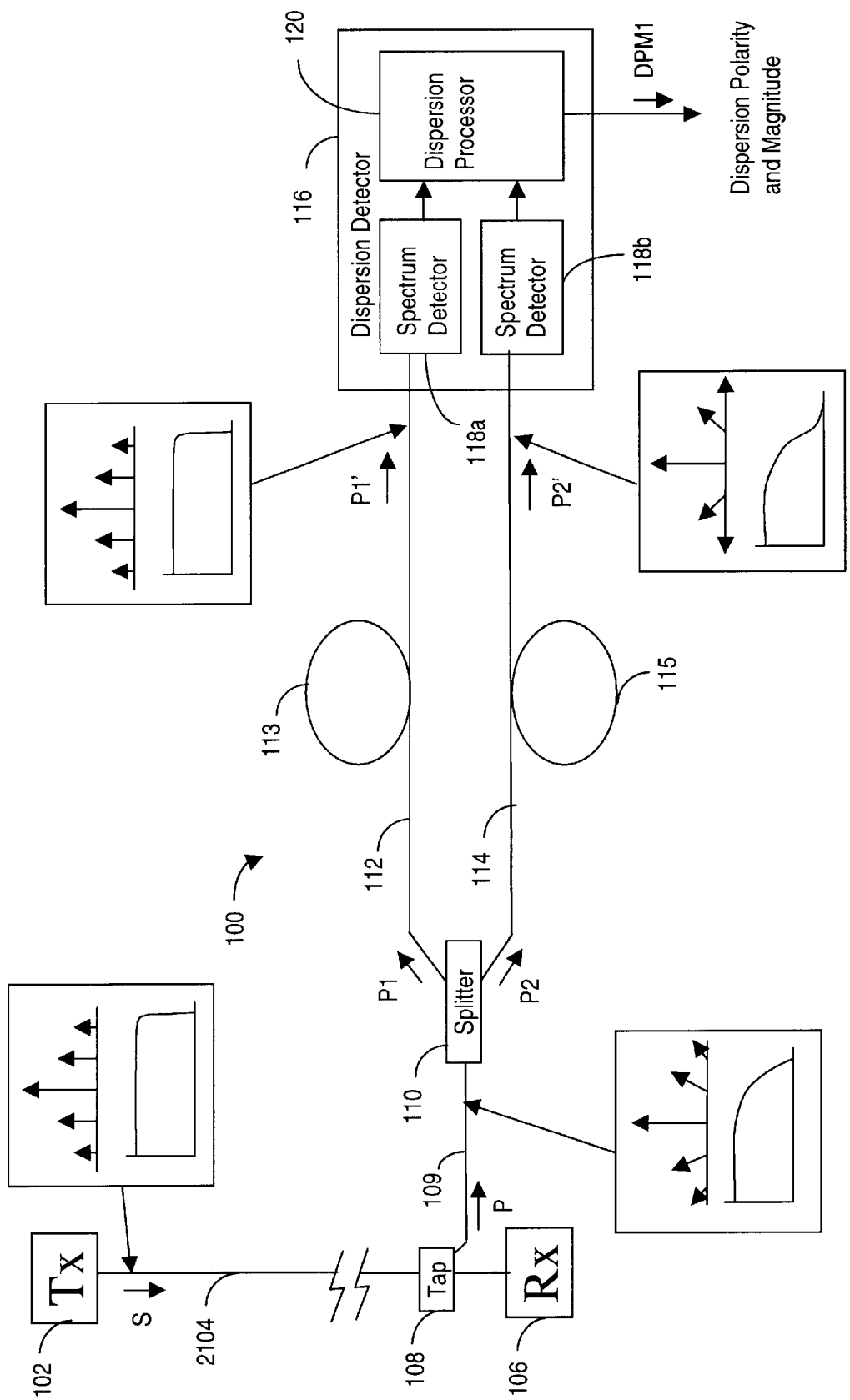
FIG. 6 depicts the operation of the dispersion discriminator of FIG. 4 on input signal having a moderate amount of negative dispersion.

Referring to FIG. 6, the operation of the dispersion discriminator 100 of FIG. 4 on an input signal having moderate negative dispersion is shown. The signal S is transmitted from the transmitter 102 along a negative dispersion transmission link 2104, which terminates at the receiver 106. In this case the dispersion on the transmission link 2104 is of the same magnitude and opposite polarity as the dispersion in the discriminator legs 112. This can be observed from the phase-amplitude diagram of the signal P1' on the positive dispersion leg 112, as the side bands are phase-aligned with the carrier (i.e. all the arrows of the phase-amplitude diagram are vertical). Normally, this phase-aligned condition would not be the case. Instead, the transmission link 2104 would have a much higher dispersion than the relatively short coil of fiber 113 in the positive dispersion leg 112.

Figure 7:
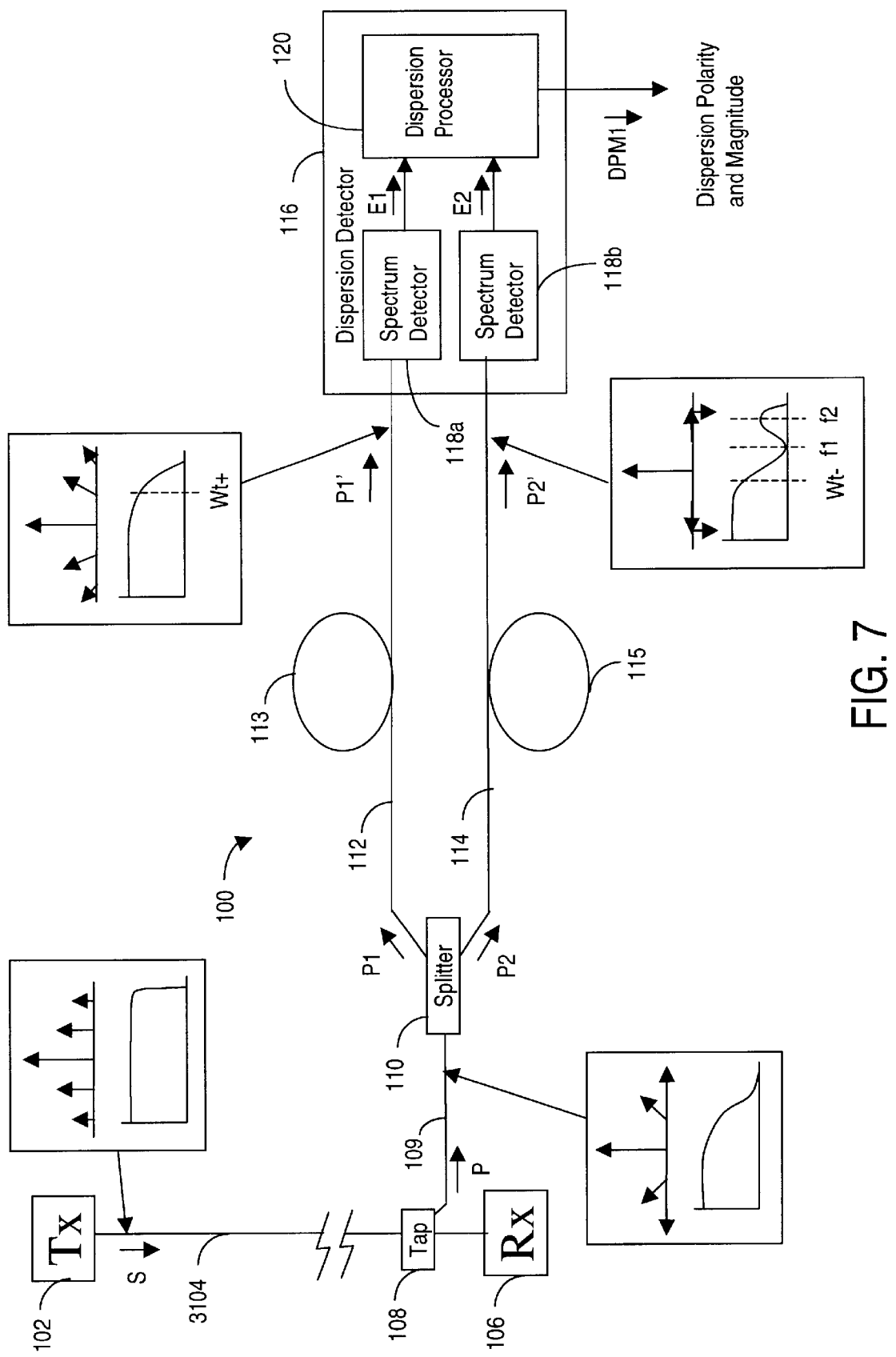
FIG. 7 depicts the operation of the dispersion discriminator of FIG. 4 on input signal having a large amount of negative dispersion.

FIG. 7 shows a case of a very large negative dispersion on a transmission link 3104. In this case the negative leg 114 has phase-shifted the high frequency components of the signal P2 from close to 90 degrees to beyond 90 degrees so the power spectrum diagram for the signal P2' shows a broad notch at the first side-band frequency f1, followed by a second spectral peak at the second side-band frequency f2. The signal P1' at the end of positive leg 112 still exhibits significant high frequency cancellation effects, as can be observed from its power spectrum diagram. Nevertheless, the first 3 dB down point ($Wt_-$) on the negative leg 114 is much lower in frequency than the corresponding 3 dB roll-off point ($Wt_+$) on the positive leg 112. Consequently, by appropriate processing at the dispersion detector 116, the polarity and approximate magnitude of dispersion in the signal S can be determined.

For the purpose of determining the required discriminator sensitivity, the dispersion characteristics of typical transmission link fiber and dispersion compensating devices will now be considered. Typical transmission link fibers are within a range of dispersion of 4–17 ps/nm-km. This dispersion has a monotonic positive slope with increasing wavelength. Specialized dispersion-compensation fibers can provide dispersions up to 100 ps/nm per dB of loss for wideband (40 nm) and 500 ps/nm per dB for narrowband. Assuming 0.2 dB per km the latter would translate to 100 ps/nm per km. At 1500 nm wavelength the frequency of the carrier is $2 \times 10^5$ GHz (i.e. c=300,000 km/sec, f carrier=$3 \times 10^8/1.5 \times 10^{-6}$=$2 \times 10^{14}$ Hz or $2 \times 10^5$ GHz). A 1 nm change in wavelength at 1500 nm wavelength will result in a 1/1500 change in frequency, which equals $2 \times 10^5/1.5 \times 10^3$=133.33 GHz. Hence the dispersion for transmission link fiber can be quoted as −0.03 (i.e. −4/133.33) to −0.127 (i.e. −17/133.33) ps/GHz-km (typically ~0.075 ps/GHz-km) and the dispersion for compensation fiber can be quoted as 0.75 (i.e. 100/133.33) to 3.76 (i.e. 500/133.33) ps/GHz-dB.

The following calculation determines the −3 dB roll-off point for the case of zero dispersion on the input signal S. The −3 dB roll-off frequencies are important in determining the frequency sensitivity required by the dispersion detector 116, as will be discussed later. The following math could be easily extended to plot the power spectrum across the complete pass-band.

Example −3 dB roll-off frequency calculation for zero transmission path dispersion:

Recalling the equation (EQ. 1) for the −3 dB cut-off frequency (W) determined previously with respect to FIG. 4:

$$W=(0.125/|y*z|)^{1/2} \qquad \text{EQ.1}$$

If we assume that W=5 GHz, and 1 dB of dispersion-compensating fiber is 5 km long (i.e. 0.2 dB/km) then z=0.75 to 3.75 ps/GHz-dB converts to 0.15–0.75 ps/GHz-km, and y=unknown to be determined, then (from EQ. 1):

$$25 = 0.125 / y*0.75*10^{-3}$$

$$y = 0.125 / 25*0.75*10^{-3}$$

$$= 0.125 / 0.01875 \text{ km}$$

= 6.667 km for the upper end (0.75 ps / GHz − km ) of the dispersion range and five times this (i.e. 33.33 km ) for the lower end (0.15 ps / GHz − km ) of dispersion range for dispersion compensating fiber.

A dispersion discriminator with a 12 km spool 113, 115 of 0.4 ps/GHz-km fiber would provide a −3 dB cut-off frequency in the positive/negative dispersion leg 112, 114 of:

$$W=0.125/(12*0.4*10^{-3})^{1/2}=5.10 \text{ GHz}$$

The dispersion detector 116 determines the difference in −3 dB roll-off frequency of the signals P1' and P2' from the positive 112 and negative legs 114 in order to determine the polarity and magnitude of dispersion that the signal S has undergone while propagating along the link 104. Recall the equations, EQ. 6 and EQ. 8, for the −3 dB frequency ($Wt_+$ and $Wt_-$) in the positive 112 and negative legs 114, respectively, which were derived earlier with reference to FIG. 5. Expressing EQ.6 and EQ. 8 in terms of total dispersion (D) of the transmission link 104 and total dispersion (d) of the positive/negative dispersion leg 112, 114 is useful in plotting the −3 dB frequencies ($Wt_+$ and $Wt_-$) vs. total dispersion (D) of the transmission link 104 in order to determine the required frequency sensitivity of the dispersion detector 116.

$$Wt_+=(125/|\{(Y*Z)+(y*z)\}|)^{1/2} \qquad \text{EQ. 6}$$

where the dispersion values are expressed in ps per GHz-km, which can also be expressed as:

$$Wt_+=(125/|\{(D)+(d)\}|)^{1/2} \qquad \text{EQ. 6'}$$

where D=total dispersion of the transmission link 104, d=total dispersion of the positive leg 112.

$$Wt_-=(125/|\{(Y*Z)-(y*z)\}|)^{1/2} \qquad \text{EQ. 8}$$

where the dispersion values are expressed in ps per GHz-km, which can also be expressed as:

$$Wt_-=(125/|\{(D)-(d)\}|)^{1/2} \qquad \text{EQ. 8'}$$

where D=total dispersion of transmission link 104, d=total dispersion the negative leg 114.

Figure 8:
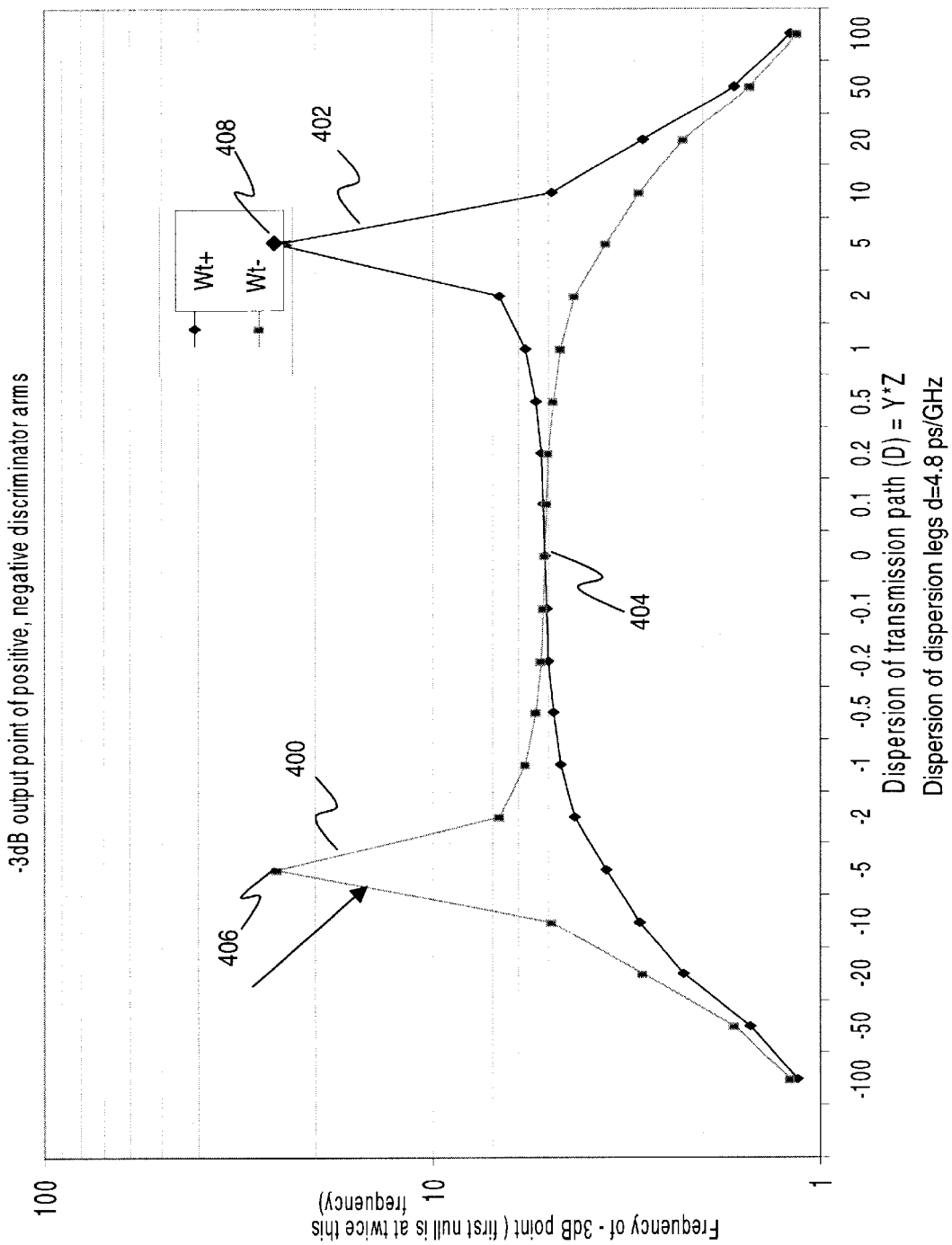
FIG. 8 is a graph displaying curves of the −3 dB frequencies of the signals output from the discriminator legs of the dispersion discriminator of FIG. 4, as a function of different amounts of positive and negative dispersion on the signal input to the dispersion discriminator

FIG. 8 displays curves 400, 402 of the −3 dB frequencies ($Wt_+$, $Wt_-$) of the signals P1', P2' output from the discriminator legs 112, 114, respectively, as a function of positive and negative dispersion on the input signal P, for the case where each discriminator leg has an incremental dispersion of 4.8 ps/GHz. The curves 400, 402 are symmetrical to each other about the zero dispersion point 404. Moving away from the zero dispersion point 404 in either direction one leg of the dispersion discriminator 100 (e.g. the positive dispersion leg 112) shows a monotonic fall-off in −3 dB frequency and the other leg (114) shows an increase in −3 dB frequency until the dispersion is equal but opposite to the dispersion in the first leg (112), then the dispersion in the other leg (114) falls off, but always remains above that of the first leg (112). Note that both curves 400, 402 display respective poles 406, 408 when the dispersion (D) of the transmission path is equal and opposite to that of the respective dispersion leg 112, 114, whereby dispersion of the leg and the path cancel each other and the resulting signal has no dispersion.

By comparing the power in the signals P1' and P2' output from the legs 112, 114 the signal with the higher −3 dB cut-off frequency ($Wt_+$, $Wt_-$), and consequently the polarity of the total dispersion (D) in the transmission link 104 effecting the signal S can be determined. This comparison is straightforward because both legs 112, 114 of the discriminator are fed with from same input signal P, which is split into equal portions P1, P2 that are fed to a respective leg 112, 114 of the discriminator 100. The magnitude of the total dispersion (D) can be determined from the relationship between the outputs E1, E2 of spectrum detectors 118a, 118b. This determination will be shown later. Assuming that the dispersion detector 116 can detect a 5–10% unbalance in the power measurement, and that, at the −3 dB point, the rate of fall of the spectral energy is trending towards 6 dB per octave, then the discriminator polarity detection function range should be from ~0.25–0.45 ps/GHz to ~100 ps/GHz, for this example. This range corresponds to dispersive paths of 8–15 km up to 3333 km with the best-case assumed outside plant fiber, and 2–3.8 up to ~833 km with the worst case fiber. Of course this is one example of a design and the parameters can be adjusted, e.g. by changing per-leg dispersion, and/or fiber length, to achieve different operating ranges and −3 dB cut-off frequencies. In particular, with the increase in the use of 10 or 40 Gb/s transmission, the discriminator −3 dB cut-off frequencies can be moved up into a (balanced case) value of 10 or even 20 GHz, since both 10 and 40 Gb/s systems contain energy at these rates. This would shorten the leg fibers by a factor of 2:1 or 4:1.

Figure 9:
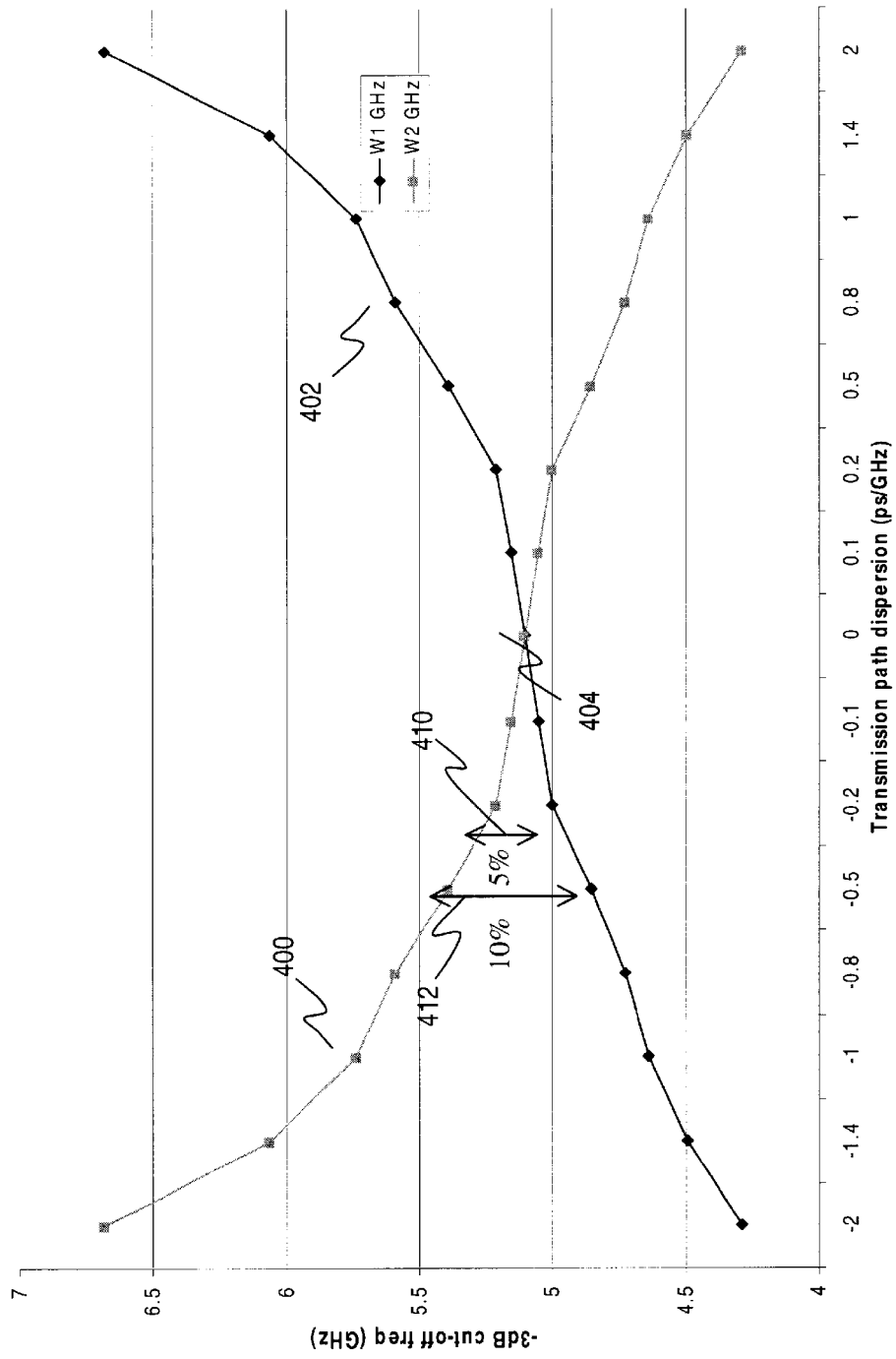
FIG. 9 shows the cross-over region of the curves of FIG. 8 in more detail and plotted on linear frequency scale.

FIG. 9 shows the cross-over region of the curves 400, 402 in more detail and plotted on linear frequency scale. The basic discriminator sensitivity is determined by the precision of the measurement and comparison of the power of the signals P1' and P2'. This precision can be increased by using slow frequency scanning and relatively long integration times. This is also necessary because the integration time at one frequency band must be substantially longer than the differences in leg delays, to ensure we are analysing the same data sample window in time, since we must allow for the case of a time-variant spectrum in the data stream. Note the points 410, 412 at which the two −3 dB points are 5 and 10% apart, respectively, are shown on the figure. This occurs at a dispersion of ~0.2–0.5 ps/GHz on the transmission path under test, which would have resulted in a −3 dB roll-off on the transmission path alone, around $(4.8/0.2)^{0.5}$ to $(4.8/0.5)^{0.5}$ times higher than the 5.1 GHz roll-off in the discriminator arms, i.e. or a range of $~5.1 \times 24^{0.5}=25$ GHz down to $~5.1 \times 9.6^{0.5}=16$ GHz for the sensitivity threshold of this discriminator design. Since 10 Gb/s systems are expected to be effectively unaffected by roll-offs above ~7–10 GHz, the specific set of parameters used in this discriminator provides a high margin of sensitivity above the requirements 10 Gb/s transmission schemes.

Since the dispersion discriminator 100 operates by comparing modified to unmodified, or differently modified versions of the same signal, it makes no assumptions or demands on the data format, bit-rate or spectrum of the signal other than that there must be signal spectral energy present at the sideband frequencies that the discriminator 100 is operating at. Furthermore, the dispersion discriminator 100 does not need information on the originating spectrum of the signal.

Figure 10:
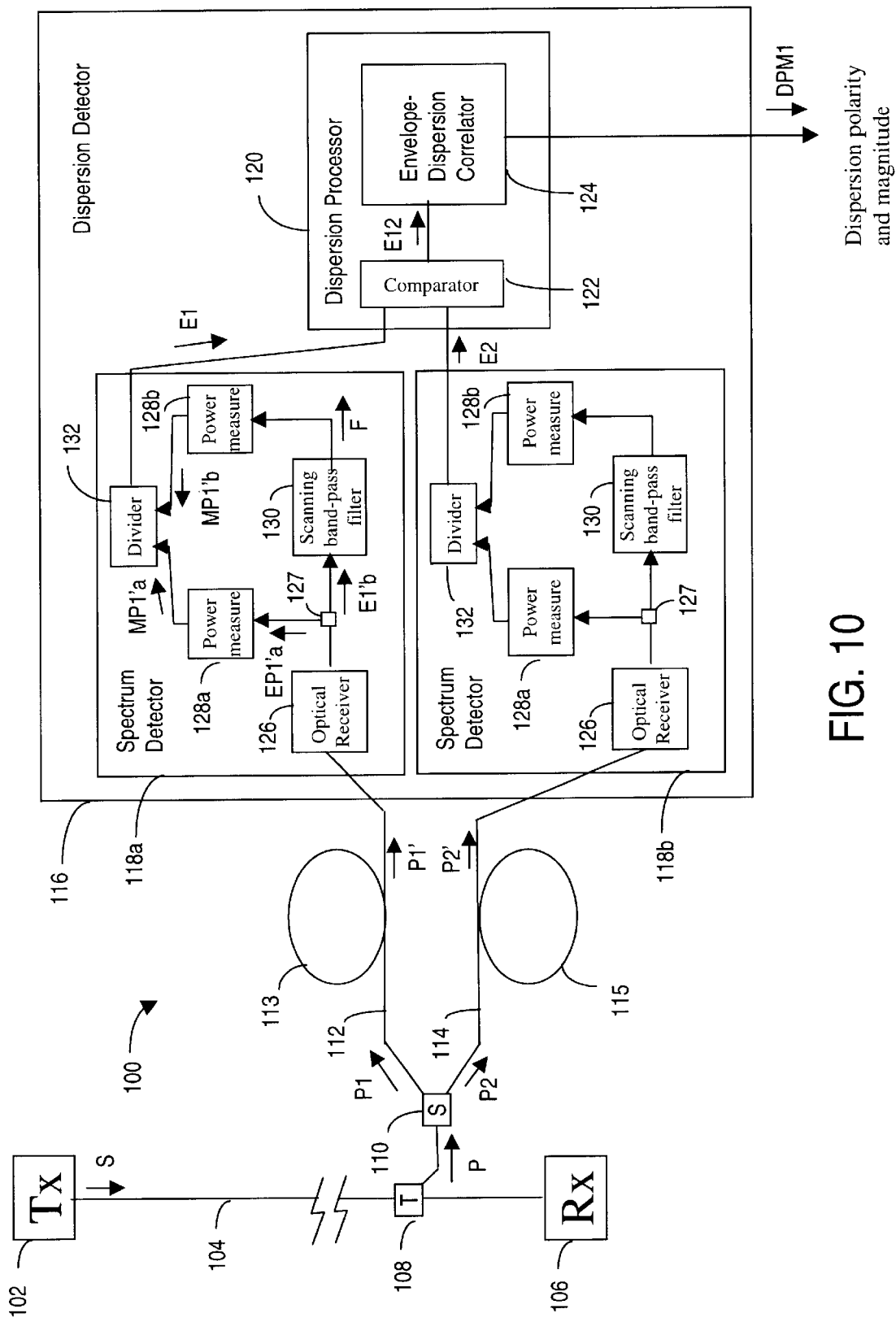
FIG. 10 is a block diagram showing the dispersion discriminator of FIG. 4 in greater detail.

FIG. 10 shows the dispersion discriminator 100 of FIG. 4 in greater detail. The dispersion detector 116 includes the spectrum detectors 118a, 118b, coupled between the dispersion legs 112, 114 and the processor 120. The first spectrum detector 118a is coupled between the positive dispersion leg 112 and the processor 120, while the second spectrum detector 118b is coupled between the negative dispersion leg 114 and the processor 120. Since the spectrum detectors 118a, 118b have the same internal structure, as depicted by the functional block diagram in FIG. 10, a description of the first spectrum detector 118a only should suffice in order to understand the present embodiment of the invention.

The first spectrum detector 118a includes an optical receiver 126 coupled to the input of the detector 118a at its input and coupled to an electrical splitter 127 at its output. The optical receiver 126 linearly receives, i.e. linearly demodulates and converts, the optical signal P1' to d.c. coupled analog electrical signal EP1' representing the analog envelope of the modulated optical carrier. The electrical splitter 127 splits the signal EP1' into two signals EP1'a and EP1'b of equal power. One output of the splitter 127 is coupled to the input of a power measuring device 128a, (which measures the mean d.c. level on the receiver output and hence the received input power), whose output is coupled to the input of a divider 132. The other output of the splitter 127 is coupled to the input of a scanning band-pass filter 130, whose output is coupled to the input of another power measuring device 128b. As an alternative to a single scanning band pass filter 130, a bank of fixed filters of relatively broad bandwidth, each of which has its own power measurement block or which are switched sequentially to the power measurement block could be used. This alternative arrangement has the advantage that multiple measurements can be done in parallel. The output of the other power measuring device 128b is coupled to another input of the divider 132, while the output of the divider 132 is coupled to the output of the spectrum detector 118a which is connected to and input of the processor 120. A power measurement MP1'a is made on the signal EP1'a by the power measuring device 128a, and another power measurement MP1'b on a portion F of the signal EP1'b in a frequency range selected by the scanning filter 130 is made by the other power measuring device 128b. The first power measurement MP1'a is divided by the second power measurement MP1'b by the divider 132 and the result E1 is output to the processor 120. The second spectrum detector 118b operates in a like fashion to produce, from the signal P2', a signal E2 which is also output to the processor 120.

The processor 120 includes comparator 122 having two inputs, each input coupled to a respective spectrum detector 118a, 118b and an output coupled to the input of an spectrum-dispersion correlator 124. The correlator 124 determines the polarity and magnitude of dispersion on the input signal P to the dispersion discriminator 100 from ratios E1, E2 of the power measurements (e.g. MP1'a and MP1'b for the signal E1) made by the spectrum detectors 118a, 118b. The spectrum-dispersion correlator 124 outputs this determination of dispersion polarity and magnitude in the signal DPM1.

For further clarity, the optical receiver 126 is a linear wideband optical receiver, and the first power measuring device 128a measures the total received power MP1'a in the signal EP1'a. The scanning band-passive filter 130 and second power measuring device 128b form a scanning filter-power measuring device, which scans frequency and measures the power MP1'b of selected spectral components F in the signal EP1'b. This sequence of measurements MP1'b is then normalized by dividing it by the total received power MP1'a to remove any effects from different losses, receiver sensitivities between the discriminator legs 112, 114 etc.

The linear receivers are broadband devices but, since no individual bit discrimination decisions are being made in the following equipment (which only examine spectral shapes and power densities) the effects of receiver noise is very different. In particular, to receive and discriminate individual bits in a receiver-discriminator requires a signal-to-receiver Gaussian noise ratio of the order of 20 dB, whereas to avoid the spectral differences between the two receivers being masked by the receiver noise requires a much lower SNR. As an example the receiver/discriminator sensitivity would be halved at a point where the signal and noise were at the same power. Hence, although the receiver is broadband, it can be driven with a signal that is 10–17 dB below that of the data receiver in the main transmission path, which has to make individual logic decisions on each bit to an extreme level of accuracy. This permits the use of an asymmetric tap and can also accommodate the loss effects of the splitter and leg-fiber. An example budget would be: leg-loss 2.4 dB, splitter loss 3.3 dB, receiver power requirement differential (relative traffic receiver) 15 dB, giving ratio of split powers (traffic/monitor)=15−2.4−3.3=9.3 dB, allowing the use of a 90:10 or 80:20 splitter.

The normalized output sequence E1, E2 from each divider 132 associated with a respective discriminator leg 112, 114 is fed to the processor 120. The comparator 122 determines which arm is exhibiting the higher high frequency roll-off measurement as a function of the data-points in the sequence. This will be shown for the cases of zero input dispersion, positive input dispersion, negative input dispersion, and highly negative dispersion (the highly positive dispersion case being intuitively obvious from the highly negative case). The spectrum-dispersion correlator 124 determines the magnitude of dispersion in the input signal P to the dispersion discriminator 100 and outputs the result of this determination in the signal DPM1.

Figure 11:
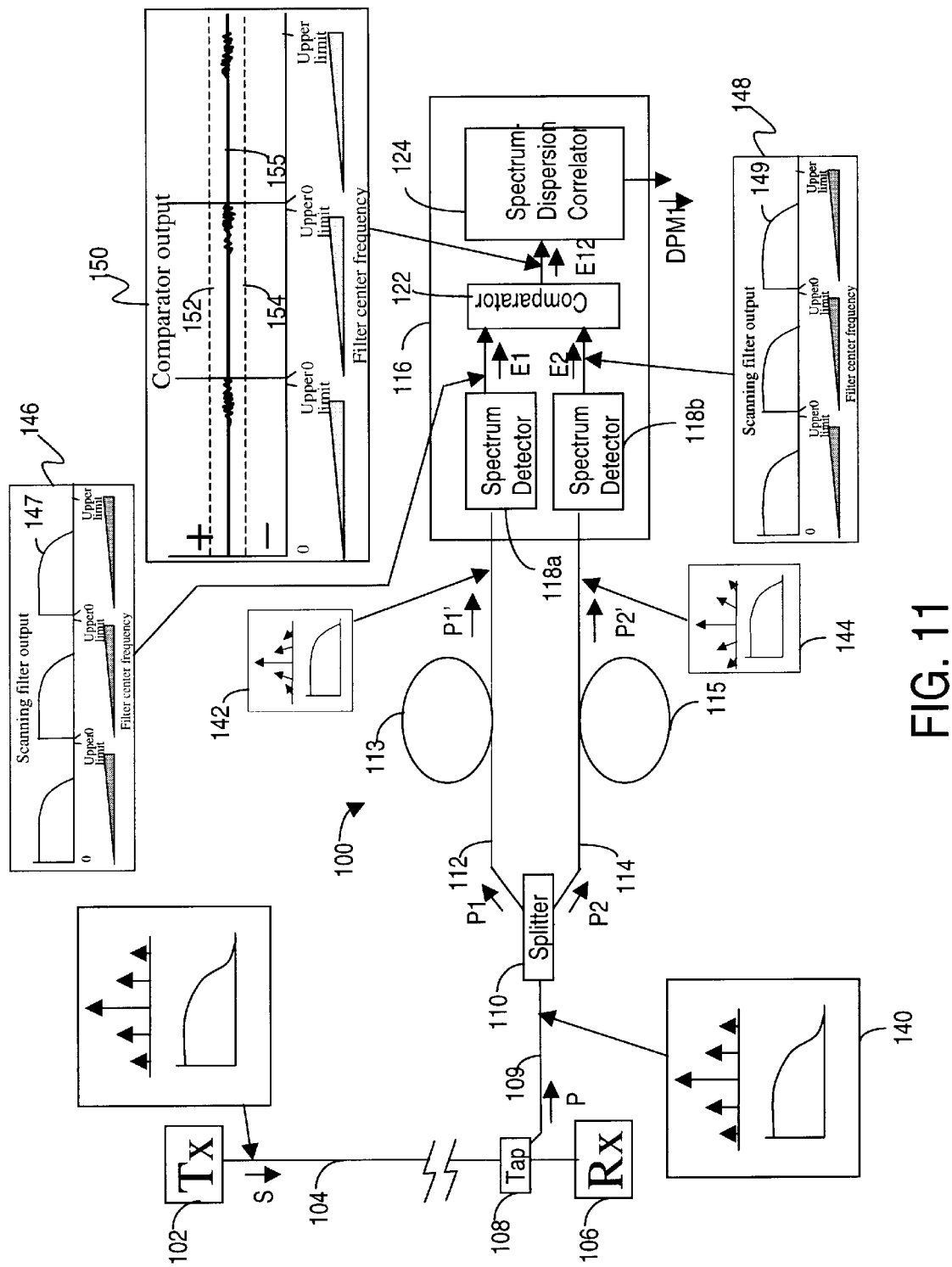
FIG. 11 depicts the operation of the dispersion discriminator of FIG. 10 on an input signal having negligible dispersion.

FIG. 11 is a diagram of the dispersion discriminator of FIG. 10 with waveforms of certain signals to explain its operation. The portion P of the signal S, transmitted by the optical transmitter 102, is tapped from the transmission link 104 by the tap 108 and input to the dispersion discriminator 100. The phase-amplitude and power spectrum diagrams for the signal P are shown in a box 140 beside the signal P. From these diagrams it can be observed that to the signal P has no dispersion, and hence represents a zero dispersion source to the dispersion discriminator 100. The signal P is split into the two signals P1 and P2 by the splitter 110. After traversing the positive 112 and negative 114 dispersions legs respectively, the altered versions P1' and P2' of the signals P1 and P2 arrive at the inputs of the dispersion detector 116. Phase-amplitude and power spectrum diagrams are shown in boxes 142 and 144 for the altered signals P1' and P2', respectively. From these diagrams it can be seen that the signal P1' has a positive dispersion (i.e. arrows in phase-amplitude diagram are rotated towards the carrier) and that the signal P2' has a negative dispersion (i.e. arrows in the phase-amplitude diagram are rotated away from the carrier).

The operation of the spectrum detectors 118a and 118b was described previously with respect to FIG. 10, the first spectrum detector 118a outputs the signal E1 and the second and globe detector 118b outputs the signal E2. Amplitude vs. time curves 147 and 149 for these signals E1 and E2 are shown in boxes 146 and 148, respectively. As indicated by the curves 147, 149 the amplitude of the signals E1, E2 remain constant initially, but roll off in amplitude with time as of the frequency of the scanning band-pass filter 130 in each spectrum detector 118a, 118b is increased. The signals E1 and E2 are input to the comparator 122 and the resultant signal E12 is input to the spectrum-dispersion correlator 124. An amplitude vs. time curve 155 of the signal E12 is shown in a box 150. The curve 155 remains at a relatively constant value, with some small amount noise when the signals E1 and E2 have low levels, and between positive 152 and negative 154 decision thresholds. Since the signal E12 does not cross either of the thresholds 152, 154 the comparator 122 provides in the spectrum-dispersion correlator 124 with the indication of zero dispersion in the input signal P. This result is indicated in the signal DPM1 output by the spectrum-dispersion correlator 124.

For further clarity, the normalized power measurements represented by the signals E1 and E2 track the power spectral density of the modulation sidebands at the input to the discriminator optical receivers 126. Whilst the relationship of these normalized power measurements to the power of the source transmitter 102 is unknown (i.e. the original line code may have had a roll-off in its spectrum) the determination of which signal P1', P2' is exhibiting the lower high frequency roll-off is determined by comparing the outputs E1, E2 of the two spectrum detectors 118a, 118b. Any perturbations in the originating spectrum will result in a common-mode effect, but perturbations due to transmission will result in a differential effect. Under these conditions it is not necessary to have a copy of the original data to determine the polarity of the dispersion.

Figure 12:
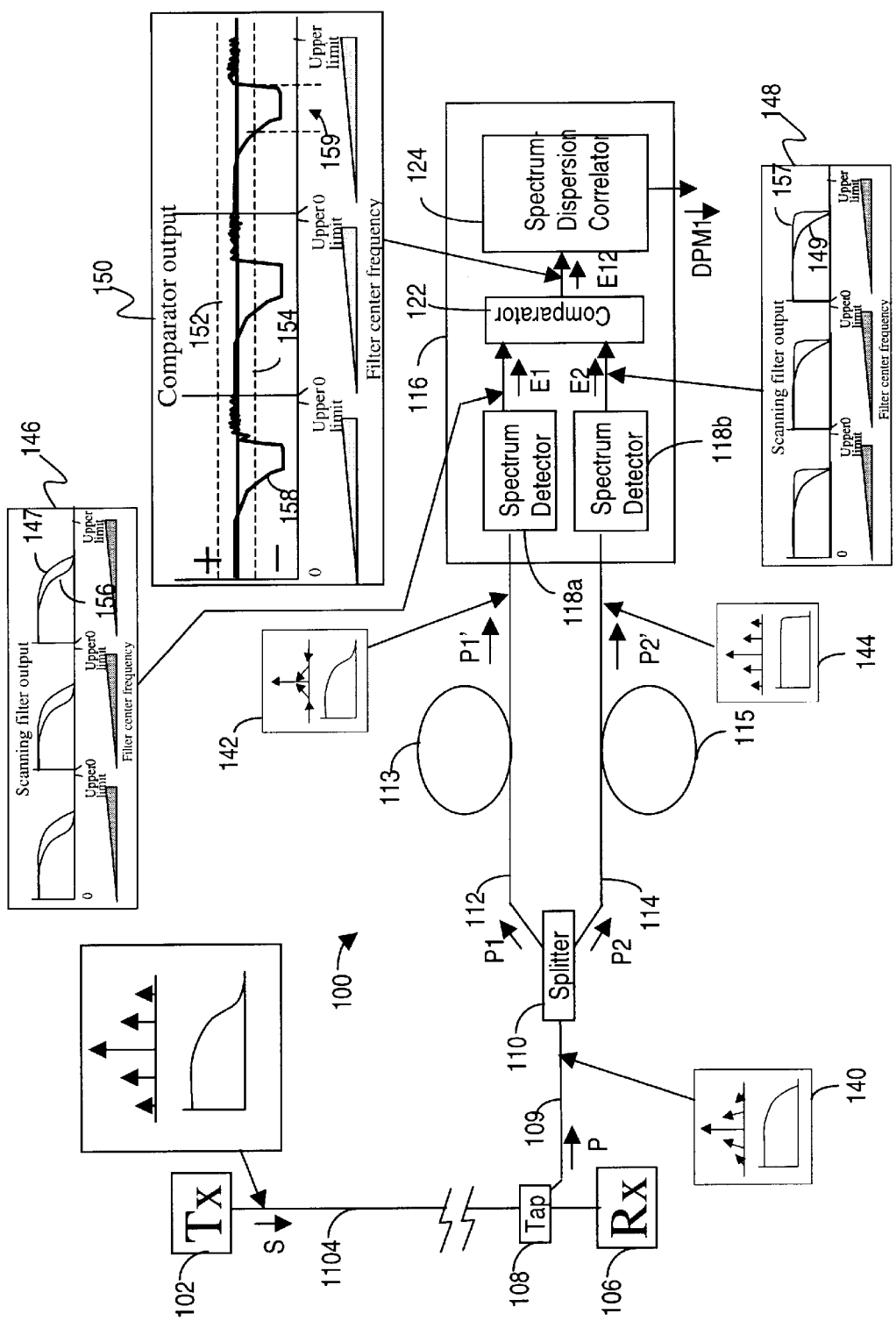
FIG. 12 depicts the operation of the dispersion discriminator of FIG. 10 on an input signal having a moderate amount of positive dispersion.

FIG. 12 shows the operation of the discriminator 100 with a moderate amount of positive dispersion in the input signal P. Under this condition, the positive dispersion leg 112 further band-limits the sidebands of the signal P1', as can be observed from the phase-amplitude and power spectrum diagrams in the box 142, while the negative leg 114 partially or fully compensates for the positive dispersion on the input signal P. This compensation can be observed from the phase-amplitude and power spectrum diagrams in the box 144 for the signal P2'. As a result of propagating along the positive 112 and negative 114 dispersion legs, the signals P1' and P2' have different bandwidths. This difference can be determined by comparing the spectra of the signals E1 and E2 at the outputs of the spectrum detectors 118a and 118b.

The scanning band-pass filter 130 and power measuring device 128b in each spectrum detector 118a, 118b provide a crude spectral analysis. Typically, the scanning band-pass filter 130 would have a filter "Q" value in the order of 5–10. Alternatively, an arrangement including a series of fixed filters, each with a power monitor, and each spaced approximately a quarter-half an octave apart, over the range 800 MHz–8 GHz could be used. This arrangement would result in the need for 3.2×4=~13 filters/receivers, which would be simple and low cost since most of the filters (those from 800 MHz to ~3 GHz could be simple resonant structures on a printed circuit board (e.g. resonant quarter-wave stubs). Whether a scanning band-pass filter 130, a series of scanning filters, or a bank of fixed filters is used, the power measurements are processed in the same way. Alternatively a fixed filter shape and a heterodyne scanning technique could be used. In this case the signal is combined with a scanning radio-frequency (RF) source and the resultant sum or difference components are filtered in a fixed microwave filter. This replaces the array of filters with a sweep oscillator, a mixer and a single fixed filter.

Curves 156 and 157 in the boxes 146 and 148 respectively display amplitude vs. time of the signals E1 and E2. These signals E1 and E2 correlate to the frequency spectre a of the signals P1' and P2', which are input to the dispersion detector 116. The comparator 122, processes these signals E1 and E2 in a manner which effectively compares the power measurements starting from the lowest frequency and moving to an upper limit to determine which of the two signals P1' or P2' input to the dispersion detector 116 has the earlier roll-off in spectral components. Comparing from lower to higher frequencies enables detection of the first roll-off frequency without interference from effects of high frequency components. For example, when high dispersion paths are analysed the high-frequency components may have been rotated beyond 90 degrees, thereby introducing a high power lobe beyond the first (and subsequent) spectral nulls. In the box 146 the curve 156 corresponding to the positive dispersion source and positive dispersion leg 112 is shown having an earlier roll-off in spectral components than the curve 146 corresponding to the zero dispersion source through the same leg 112. In the box 148 the curve 157 corresponding to the positive dispersion source and negative dispersion leg 114 is shown having a later roll-off in spectral components than the curve 149 corresponding to the zero dispersion source through the same leg 114.

Curve 158 in the box 150 shows the amplitude vs. time of the signal E12 output from the comparator 122. The curve 158 is below the negative threshold 154 during a period 159 when the curve 156, corresponding to the signal E1, is less in magnitude than the curve 157, corresponding to the signal E2, thereby indicating a positive dispersion source. Note that the curve 158 never crosses the positive threshold 152.

The spectrum-dispersion correlator 124 receives the signal E12 from the comparator 122 and uses the polarity as well as the magnitude of this signal to determine the polarity and magnitude of dispersion in the signal P. This determination is made by using the data from the crossover region 204 of FIG. 9 relating the difference in −3 dB cut-off frequency to transmission path dispersion (D) for given amount of known dispersion (d) in the positive 112 a negative dispersion legs. This data may be kept in the form of a table which is indexed according to the clarity and magnitude of the comparator output signal E12. The resulting determination of polarity and magnitude of dispersion in the input signal P is output by the spectrum-dispersion correlator 124 in the signal DPM1.

Figure 13:
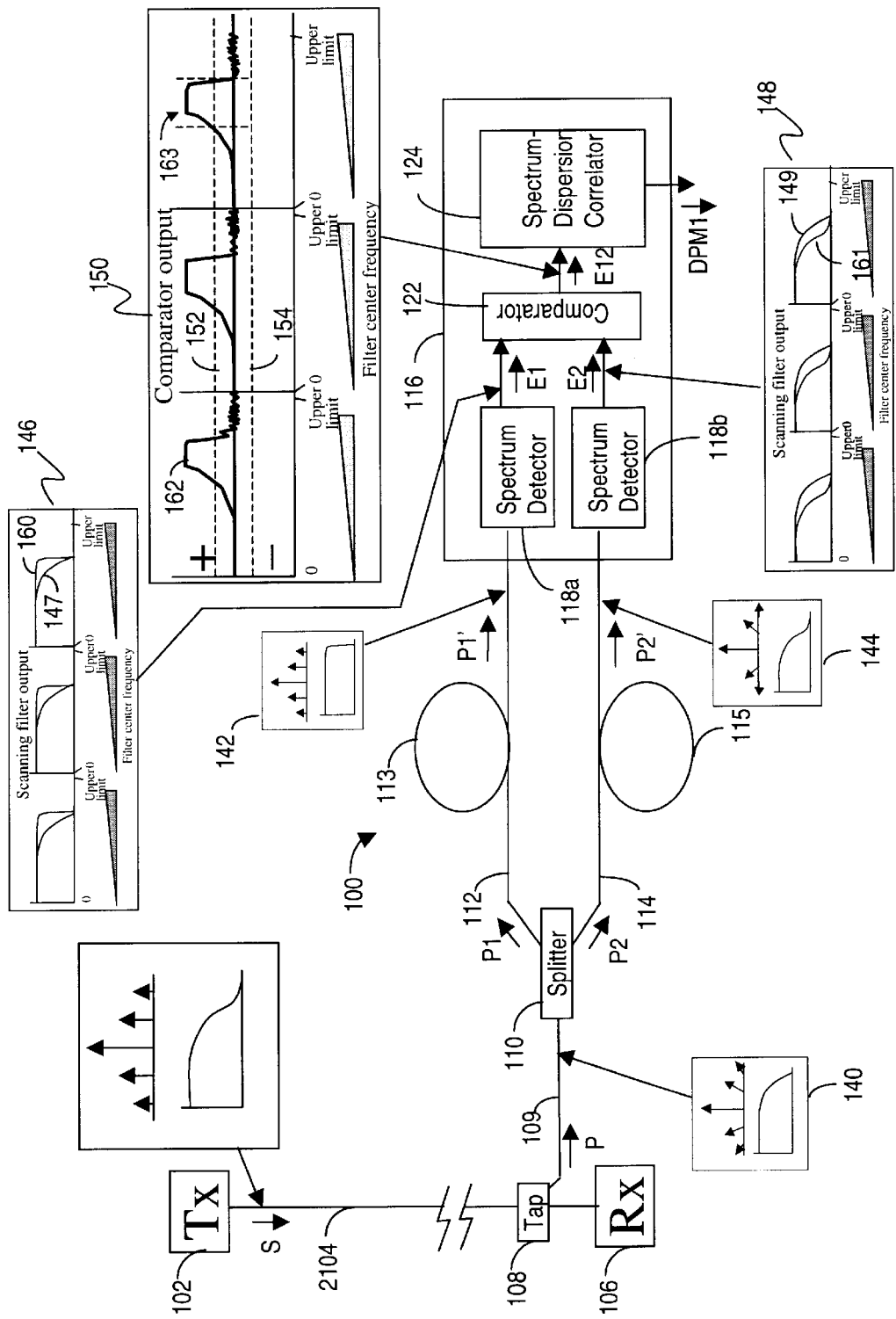
FIG. 13 depicts the operation of the dispersion discriminator of FIG. 10 on an input signal having a moderate amount of negative dispersion.

FIG. 13 shows the operation of the dispersion discriminator 100 with a moderate amount of negative dispersion in the input signal P. Note that the effects of the two legs 112, 114 have been reversed, providing a basic polarity discrimination. Note that, as in the case shown in FIG. 12, the comparator 122 will remain approximately balanced with increasing frequency until the differences in the dispersion of the legs 112,114 impact the spectral components of the signals P1' and P2', at which point the magnitude of the signal E1 or E2 with maximum dispersion will reduce, causing the comparator 122 to become unbalanced, thereby indicating the polarity of dispersion in the input signal P. Amplitude vs. time curves 160 and 161 of the signals E1 and E2 are shown in the boxes 146 and 148, respectively. Curve 162 representing amplitude vs. time of the output signal E12 of the comparator 122 is shown in the box 150. The curve 162 is above the positive threshold 152 for a period of time 163 in which the signal E1 is greater in magnitude than the signal E2, thereby indicating negative dispersion in the input signal P of the dispersion discriminator 100.

Furthermore, the frequency at which the comparator 122 becomes unbalanced can provide a rough indication of the level of dispersion present. For example, examining FIGS. 8 and 9, taking the lowest frequency at which a significant difference can be observed will approximately follow the lesser bandwidth of the two discriminator plots 200, 202. An approximate relationship would be:

100 ps/GHz at 1.1 GHz (~dispersion from ~1333 km of typical OSP fiber)

50 ps/GHz at 1.5 GHz (~dispersion from ~667 km of typical OSP fiber)

20 ps/GHz at 2.2 GHz (~dispersion from ~266 km of typical OSP fiber)

10 ps/GHZ at 3 GHz (~dispersion from ~133 km of typical OSP fiber)

5 ps/GHz at 3.5 GHz (~dispersion from ~67 km of typical OSP fiber)

2 ps/GHz at 4.1 GHz (~dispersion from ~26.7 km of typical OSP fiber)

1 ps/GHz at 4.8 GHz (~dispersion from ~13.3 km of typical OSP fiber)

Hence the discriminator has more than enough sensitivity for both 10 Gb/s and 40 Gb/s working (10 Gb/s must be dispersion compensated down to ~300–1000 km, but lower is better, and 40 Gb/s has to be dispersion compensated down to ~20–64 km . . . though better than this is always an improvement. Whilst this discriminator in itself provides no compensation, it has the required sensitivity to be used as part of an auto-compensation system).

These numbers (e.g. from the approximate relationship above) are used in the spectrum-dispersion correlator 124 to provide a model of dispersion for a given transmission link 104, whereby an approximate magnitude and polarity of the dispersion in the input signal P of the dispersion discriminator 100 can be determined. The spectrum-dispersion correlator 124 can be implemented with a microprocessor running a program stored in an on-chip, or external, memory that in effect performs, for a given dispersion model, a table look-up of dispersion for the frequency at which the comparator becomes unbalanced.

Figure 14:
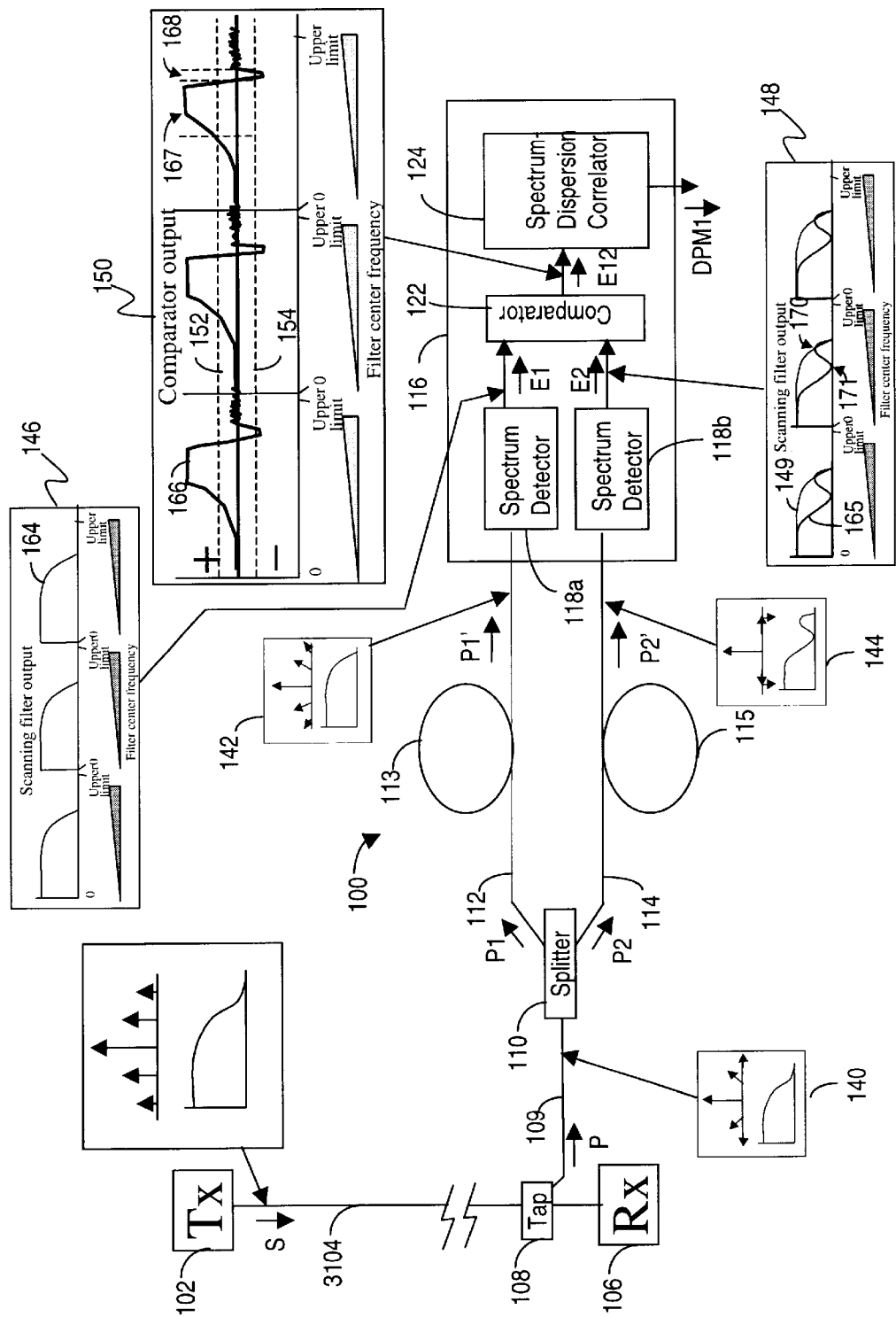
FIG. 14 depicts the operation of the dispersion discriminator of FIG. 10 on an input signal having a large amount of negative dispersion.

FIG. 14 shows the operation of the dispersion discriminator 100 with a large amount of negative dispersion in the input signal P. In this case, the negative dispersion legged 114 adds further negative dispersion to the signal P2', thereby driving the highest frequency components well beyond a 90 degree phase shift so that these components start to add constructively, but in anti-phase, producing a secondary peak in the power spectrum, beyond a cancellation notch, which is now at mid-frequencies. An amplitude vs. time curve 165 of the signal E2, which corresponds to the power spectrum of the signal P2', is shown in the box 148. The secondary peak and cancellation notch in this power spectrum is shown by the peak 170 and notch 171, respectively, in the curve 165. The positive dispersion leg 112 reduces the impairments of the incoming signal P1 but does not cancel them. An amplitude vs. time curve 164 of the signal E1, which corresponds to the power spectrum of the signal P1', is shown in the box 146. Curve 164 is similar in shape to that of curve 147, which corresponds the zero dispersion source case. An amplitude reverses time curve 166 of the signal E12 is displayed in the box 150. The curve 166 has a first period 167 above the positive threshold 152 when the signal E1 is greater in magnitude than the signal E2, and a second period 168 when the signal E2 is greater in magnitude than the signal E1. Hence, there are now frequencies where the comparator 122 is balanced, frequencies where the comparator 122 is unbalanced in a positive direction (i.e. during the first period 167) and frequencies where the comparator 122 is unbalanced in a negative direction (i.e. during the second period 168).

However, scanning from lower to higher frequencies results in the first instance of imbalance of the comparator 122 being indicative of the polarity of the input dispersion.

In this case, the first period 167 of imbalance indicates negative dispersion in the input signal P of the dispersion discriminator 100. The second period 168 of imbalance in a direction opposite to the first period of imbalance 167 indicates a high amount of dispersion in the input signal P. This second indication is used by the spectrum-dispersion correlator 124 in determining the magnitude of dispersion in the input signal P.

Figure 15:
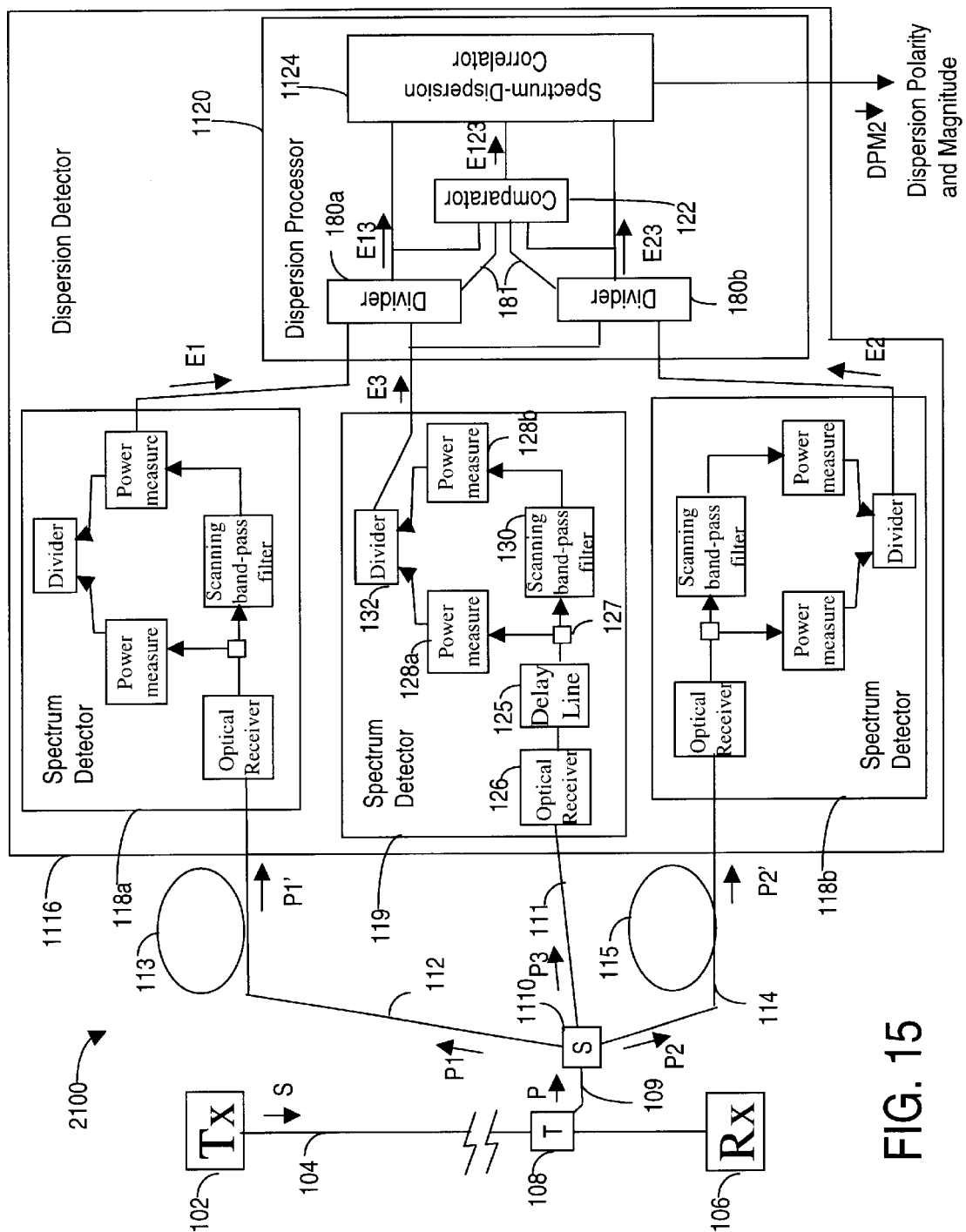
FIG. 15 is a functional block diagram of a three-leg dispersion discriminator in accordance with a third embodiment of the present invention.

FIG. 15 shows a three-leg dispersion discriminator 2100 in accordance with another embodiment of the present invention. The three-leg dispersion discriminator 2100 is similar to the previous two-leg dispersion discriminator 100, except an additional leg 111 having zero dispersion and coupled to an output of a three-leg splitter 1110 has been added. Additionally, a spectrum detector 119 for the zero dispersion leg 111 has been added to a modified dispersion detector 1116. The modified the dispersion detector 1116 also includes a modified dispersion processor 1120, which has inputs coupled to the outputs of respective spectrum detectors 118a, 118b and 119. The modified dispersion detector 1116 includes a pair of dividers 180a and 180b; the first divider 180a coupled to the outputs of the spectrum detectors 118a and 119, and the second divider 180b coupled to the outputs of the spectrum detectors 118b and 119. The output of each divider 180a and 180b is coupled to the comparator 122 and to a modified spectrum-dispersion correlator 1124.

The spectrum detector 119 coupled to the zero dispersion leg 111 is similar to the spectrum detectors 118a and 118b previously described, except it includes a delay line 125 coupled between the optical receiver 126 and the electrical splitter 127. The delay line 125 is for compensating delays in the positive 112 and negative 114 dispersion legs resulting from the respective dispersive coils of the fiber 113, 115 included in those legs. In the case where the output data from the scanning filter has been digitized, the delay line 125 could be implemented by means of a FIFO, otherwise an analog delay circuit could be used.

In operation, a signal S transmitted by the optical transmitter 102 propagates along the dispersive transmission path 104 resulting in a dispersed optical signal S'. The optical tap 108 taps portion P of this dispersed signal S' and couples it to the three-leg splitter 1110 via the optical fiber 109. The splitter 1110 splits the signal P into three portions represented by the signals P1, P2, and P3. The signal P1 propagates along the positive dispersion leg 112, while the signal P2 propagates along the negative dispersion leg 114 and the signal P3 propagates along the zero dispersion leg 111. Propagated signals P1' and P2' arrive at inputs to their respective spectrum detectors 118a and 118b, which output signals E1 and E2 corresponding to the power spectral density of the propagated signals P1' and P2'. The signal P3 propagates along the zero dispersion leg 111 unaffected and arrives at the input of the spectrum detector 119 which outputs a signal E3 corresponding to the power spectral density of the signal P3. In the first divider 180a divides the signal E1 by the signal E3 and outputs a resulting signal E13 to the comparator 122 and the spectrum-dispersion correlator 1124. Similarly, the second divider 180b divides the signal E2 by the signal E3 and outputs are resulting signal E23 to the comparator 122 and the spectrum-dispersion correlator 1124. The comparator 122 subtracts the signal E13 from the signal E23 and outputs a difference signal E123 to the spectrum-dispersion correlator 1124. The spectrum-dispersion correlator 1124 analyzes the difference signal E123 to determine the polarity and magnitude of dispersion in the input signal P, which determination is then output in a signal DPM2 to be used by a dispersion compensator, or other like apparatus. This determination may be accomplished using empirical data stored in a table as described previously. Additionally, the comparator 122 is provided with disable inputs 181 coupled to the dividers 180a and 180b to avoid divide-by-zero errors. When the dividers 180a, 180b have an output below a predetermined level (i.e. are at/close to zero spectral density) disable outputs on the dividers 180a, 180b provide a signal to disable the comparator 122 via its disable inputs. This condition can only occur when there is no signal spectrum present or the scanning has already passed the first 3 dB cut-off frequency, this only being the case when the discriminator is balanced and therefore there is zero dispersion on the input.

Figure 16:
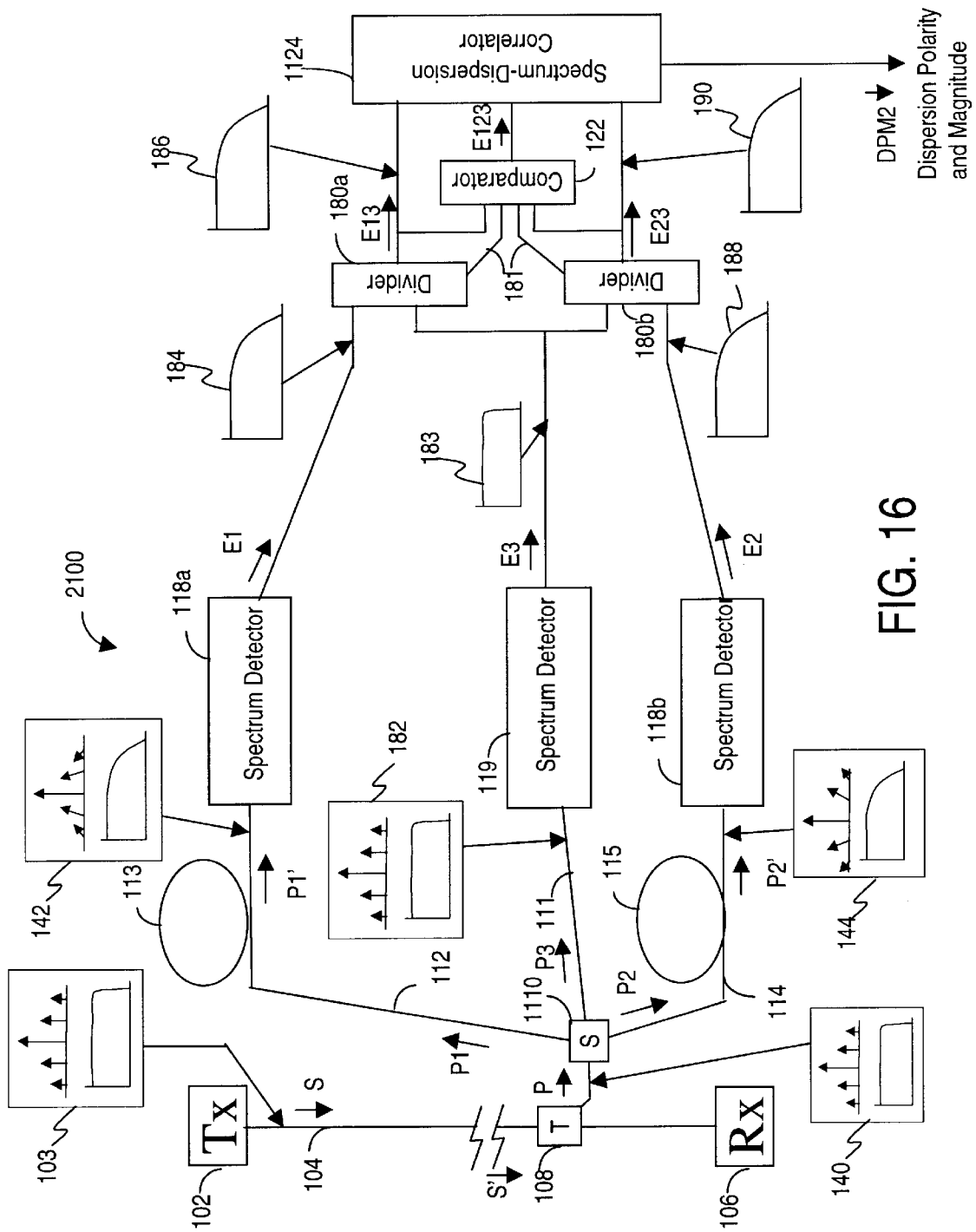
FIG. 16 depicts the operation of the dispersion discriminator of FIG. 15 on an input signal having negligible dispersion.

FIG. 16 shows the operation of the three-legged dispersion discriminator 2100 in the case of an input signal P with zero dispersion. Phase-amplitude and power spectrum diagrams for the signal S and a tapped portion P thereof are shown in boxes 103 and 140 respectively. In this case, the transmission path 104 has no dispersion effects on the signal tests, as can be observed from the phase-amplitude and power spectrum diagrams in the boxes 103 and 140, which are the same. Phase-amplitude and power spectrum diagrams in boxes 142, 182, and 144 are shown for the signals P1', P3, and P2' after propagation along the positive 112, zero 111, and negative 114 dispersion legs, respectively. As can be observed from these diagrams, the signal P3 displays no dispersive effects while the signal P1' displays positive dispersion effects and the signal P2' displays negative dispersion effects. As can be observed from the power spectrum diagrams, the signals P1' and P2' affected by a dispersion have a lower −3 dB roll-off frequency than the signal P3, which the dispersion discriminator 2100 has not affected by dispersion. The dividers 180a and 180b use the power spectrum of the unaffected signal P3 (i.e. the signal E3 of the spectrum detector 119) to normalize the outputs E1 and E2 of the spectrum detectors 118a and 118b. The amplitude vs. time response of the signal E3 is shown by the curve 183. The normalization of the signal E1 is shown by the curve 184 representing the amplitude vs. time response of the signal E1, and the curve 186 representing the amplitude vs. time response of the signal E1 after being normalized by the signal E3, which results in the signal E13. Similarly, the curve 188 represents the amplitude vs. time response of the signal E2, and the curve 190 represents the amplitude vs. time response of the signal E2 after being normalized by the signal E3, which results in the signal E23. By comparing the signals E13 and E23 the comparator 122 is effectively comparing the power spectrum of the dispersed signals P1' and to P2' normalized by the power spectrum of the and dispersed signal P3.

Figure 17:
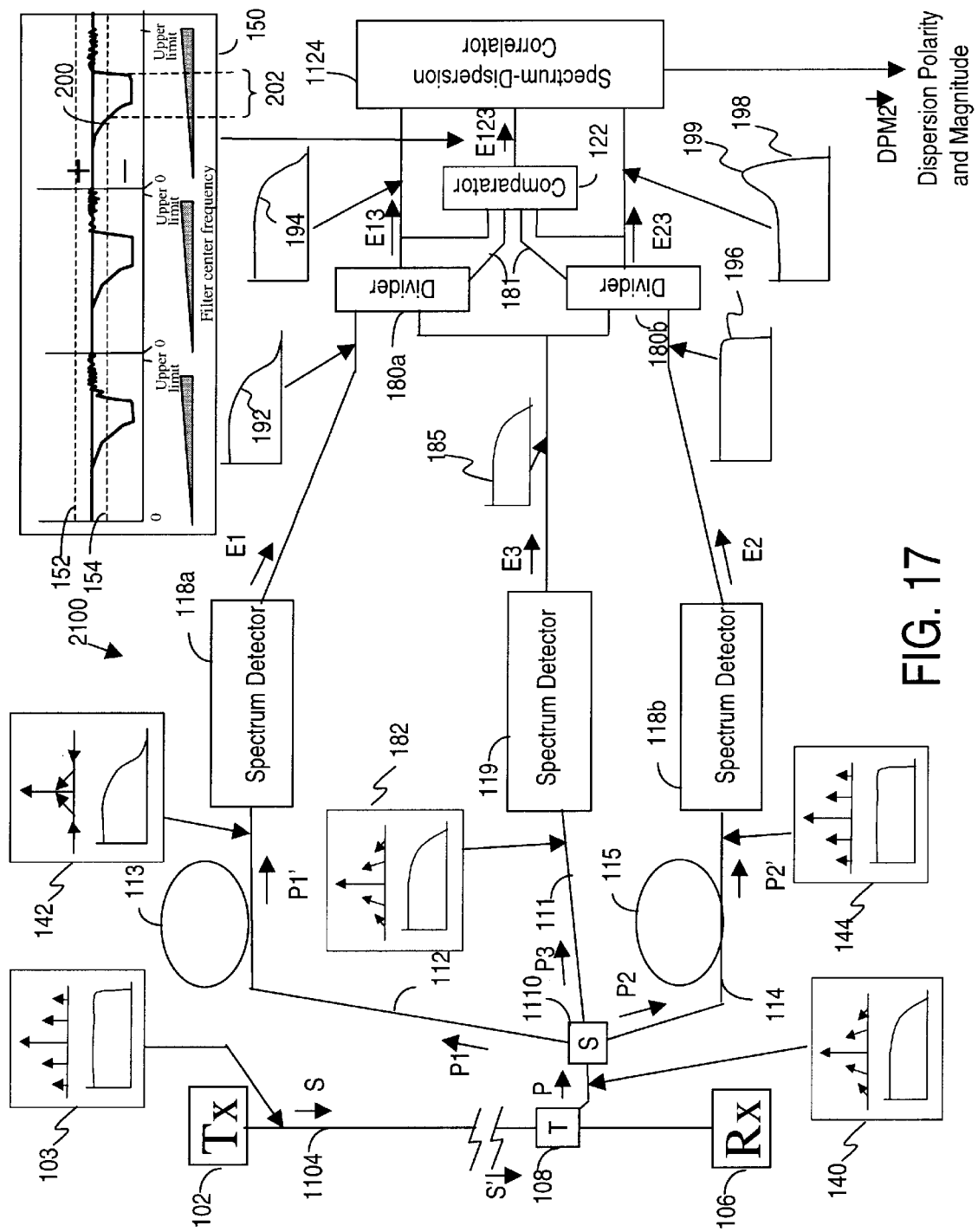
FIG. 17 depicts the operation of the dispersion discriminator of FIG. 15 on an input signal having a moderate amount of positive dispersion.

FIG. 17 shows the operation of the three-legged dispersion discriminator 2100 in the case of an input signal P of with positive dispersion. In this case, the phase-amplitude and power spectrum diagrams for the signal P in box 140 display the effects of positive dispersion via rotation of the arrows, which represent the side bands, towards the carrier and a reduction in the −3 dB roll-off frequency compared to those in the box 103 for the signal S. The phase-amplitude and power spectrum diagrams in boxes 142, 182, and 144 display the effects of the positive 112, zero 111, and negative 114 dispersion legs on the signals P1, P3, and P2, respectively. The amplitude vs. time response of the signal E3 is shown by the curve 185. The effect of normalizing the signal E1 with the signal E3 can be observed by comparing curve 192, which corresponds to the signal E1, with curve 194, which corresponds to normalized signal E13. Effectively, the process of normalization tends to enhance any difference in the power spectrum of the signal P1', P2' from the positive 112 or negative 114 dispersion leg from that of the signal P3 from the zero dispersion leg 111. Curve 198 represents the amplitude vs. time response of the normalized signal E23, which is the signal E3 after being normalized by the signal E2 represented by curve 196. The increase in the −3 dB roll-off frequency in the signal P2 caused by the negative dispersion leg 114 can be observed by a peak 199 in the curve 198. Curve 200 displayed in the box 202 shows the amplitude vs. time response of the signal E123, which is the result of subtracting the signal E23 from the signal E13. The curve 200 extends below the negative threshold 154 for a period 202, corresponding approximately to the duration of the peak 199, where the signal E23 is greater in magnitude than the signal E13, thereby indicating positive dispersion in the input signal P.

Figure 18:
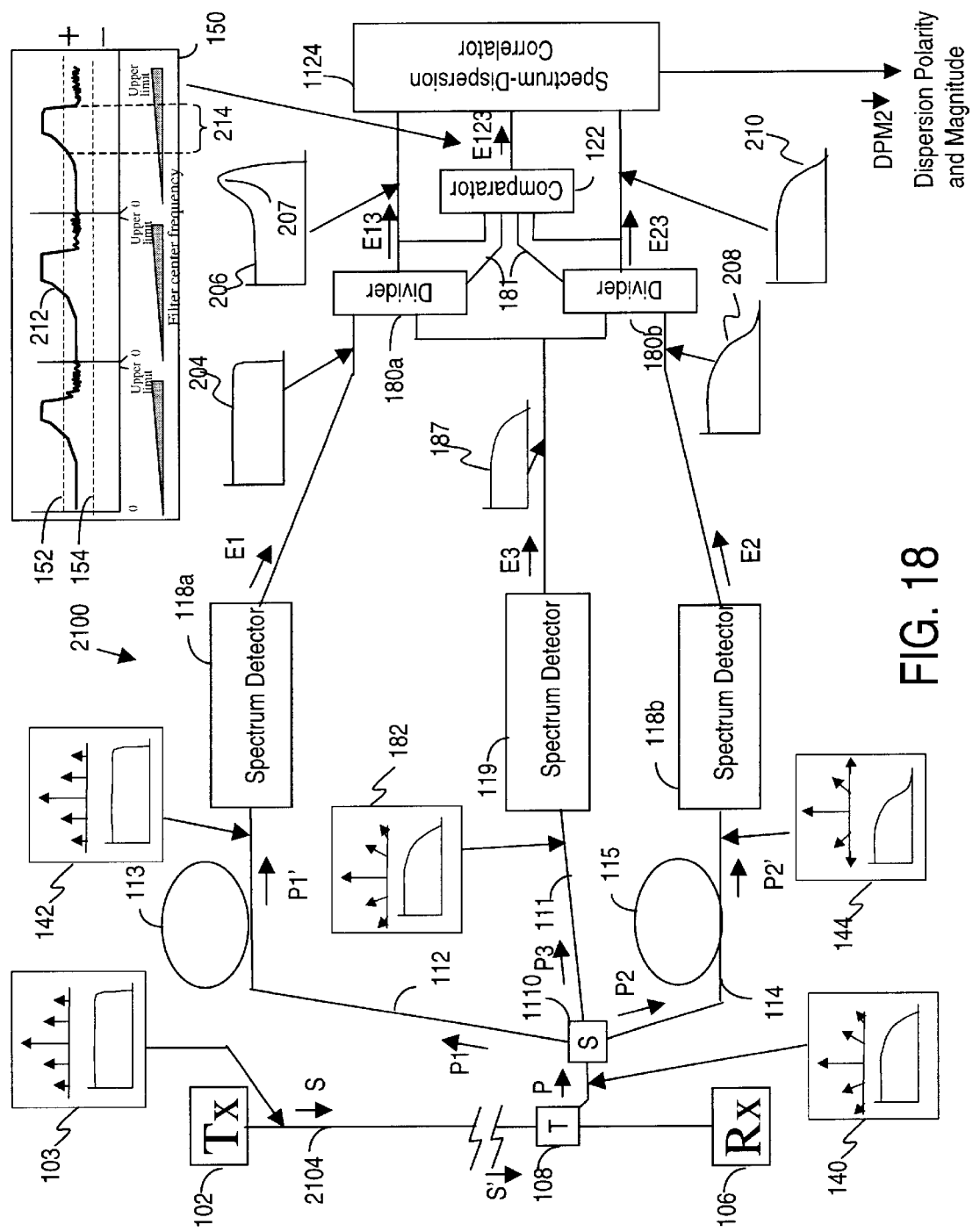
FIG. 18 depicts the operation of the dispersion discriminator of FIG. 15 on an input signal having a moderate amount of negative dispersion.

FIG. 18 shows the operation of the three-legged dispersion discriminator 2100 in the case of an input signal P having negative dispersion. In this case, the phase-amplitude and power spectrum diagrams for the signal P in box 140 display the effects of negative dispersion via rotation of the arrows, which represent the side bands, away from the carrier and a reduction in the −3 dB roll-off frequency compared to those in the box 103 for the signal S. The phase-amplitude and power spectrum diagrams in boxes 142, 182, and 144 display the effects of the positive 112, zero 111, and negative 114 dispersion legs on the signals P1, P3, and P2, respectively. The amplitude vs. time response of the signal E3 is shown by the curve 183. The effect of normalizing the signal E1 with the signal E3 can be observed by comparing curve 204, which corresponds to the signal E1, with curve 206, which corresponds to the normalized signal E13. Effectively, the process of normalization tends to enhance any difference in the power spectrum of the signal P1', P2' from the positive 112 or negative 114 dispersion leg from that of the signal P3 from the zero dispersion leg 111. Curve 210 represents the amplitude vs. time response of the normalized signal E23, which is the signal E3 after being normalized by the signal E2 represented by curve 208. The increase in the −3 dB roll-off frequency in the signal P1 caused by the positive dispersion leg 112 can be observed by a peak 207 in the curve 206. Curve 212 displayed in the box 202 displays the amplitude vs. time response of the signal E123, which is the result of subtracting the signal E23 from the signal E13. The curve 212 extends above the positive threshold 152 for a period 214, corresponding approximately to the duration of the peak 207, where the signal E13 is greater in magnitude than the signal E23, thereby indicating negative dispersion in the input signal P.

An advantage of the three-leg dispersion discriminator 2100 over the two-leg dispersion discriminator 100 is the improved dispersion detection sensitivity gained by adding the zero dispersion leg with which normalization of the power spectrum of signals from the other two legs 112, 114 is enabled, thereby enhancing any differences in their power spectra. Allowing ambiguities in the measured spectral roll-off to be determined. For instance, considering FIG. 9, there are not one, but two dispersion levels, albeit at different pairs of frequencies, that give the same delta between the amplitudes measured in the two arms. This is resolved in the two-arm case by recourse to frequency of roll-off analysis as was mentioned earlier. However in the three arm case, the frequency of roll-off of the two legs can be determined directly against the input signal, rather than against an "anti-dispersed" version of the input signal, resulting in a more accurate measure of the roll-off frequency. The roll-off frequency measured can be expressed as:

$$F_{-3dB} = (0.125/|D_1+D_2|)^{1/2}$$

where D1 is the dispersion on the optical path, D2 is the dispersion on one leg of the discriminator Clearly, where portions of the optical signal required by the dispersion discriminator can be supplied by the system in which it is used, the optical splitter provided to obtain these portions from a single optical signal is not required and hence may be removed from the dispersion discriminator.

Numerous alterations, variations and adaptations to the embodiments of the invention described above are possible within the scope of the invention, which is defined by the claims.

What is claimed is:

1. A dispersion discriminator for determining the amount of dispersion in an amplitude modulated optical signal, the dispersion discriminator comprising:
   a splitter for dividing the optical signal into at least first and second portions;
   a first dispersion leg for causing a first additional amount of dispersion in the first portion;
   a second dispersion leg for causing a second additional amount of dispersion in the second portion that is opposite in polarity and substantially equal in magnitude to the first additional amount such that the amount of dispersion in the second portion is detectably different from the amount of dispersion in the first portion; and
   a dispersion detector for receiving the first and second portions from the respective dispersion legs, determining the amount of dispersion in the optical signal by detecting a difference between the amount of dispersion in the received first and second portions, and providing an indication of said amount of dispersion in the optical signal.

2. The dispersion discriminator of claim 1, wherein the dispersion detector comprises:
   a first spectrum detector for determining the power spectrum of the received first portion;
   a second spectrum detector for determining the power spectrum of the received second portion; and
   a dispersion processor for comparing the power spectra of the received first and second portions in order to determine said difference.

3. The dispersion discriminator of claim 2, wherein the dispersion processor is operable to compare −3 dB cut-off frequencies of said power spectra in order to determine said difference.

4. The dispersion discriminator of claim 3, wherein the dispersion processor is further operable to compare notches and peaks in said power spectra in order to determine said difference.

5. The dispersion discriminator of claim 4, wherein:
   each spectrum detector outputs a signal representing a normalized power spectrum of an optical input signal provided thereto;
   a first optical input signal for the first spectrum detector is the first portion after having propagated through the first dispersion leg, and a second optical input signal for the second spectrum detector is the second portion after having propagated through the second dispersion leg; and
   the dispersion processor comprises: a comparator for providing a comparison of the signals representing the normalized power spectrum; and a spectrum-dispersion correlator for determining, from the comparison, the dispersion in the optical signal.

6. The dispersion discriminator of claim 5, wherein each spectrum detector comprises:

an optical receiver for receiving the optical input signal by demodulating data carried in the optical input signal and outputting the demodulated data in an electrical signal;

a scanning band-pass filter for selectively passing, in a filter output signal, a band of frequency components of the electrical signal provided thereto;

a first power measuring device for providing a measurement of the total power of the electrical signal;

a second power measuring device for providing a measurement of the power of the filter output signal; and a divider for dividing the measurements from the power measuring devices and outputting said signal representing the normalized power spectrum.

7. The dispersion discriminator of claim 1, wherein:

the splitter is operable to provide a third portion of the optical signal, and the dispersion detector is further operable to receive the third portion and compare the received first portion relative to the received third portion with the received second portion relative to the received third portion in detecting said difference.

8. The dispersion discriminator of claim 7, wherein the dispersion detector further comprises:

a first spectrum detector for determining the power spectrum of the received first portion;

a second spectrum detector for determining the power spectrum of the received second portion;

a third spectrum detector for determining the power spectrum of the received third portion; and a dispersion processor being operable to:
  determine a first relative power spectrum that is the power spectrum of the received first portion relative to the power spectrum of the received third portion;
  determine a second relative power spectrum that is the power spectrum of the received second portion relative to the power spectrum of the received third portion; and
  compare the first and second relative power spectra in determining said difference.

9. The dispersion discriminator of claim 8, wherein the dispersion processor is further operable to compare a −3 dB cut-off frequency of the first relative power spectrum with a −3 dB cut-off frequency of the second relative power spectrum in order to determine said difference.

10. The dispersion discriminator of claim 9, wherein the dispersion processor is further operable to compare notches and peaks in said relative power spectra in order to determine said difference.

11. The dispersion discriminator of claim 10, wherein:

each spectrum detector outputs a signal representing a normalized power spectrum of an optical input signal provided thereto;

a first optical input signal for the first spectrum detector is the received first portion, a second optical input signal for the second spectrum detector is the received second portion, and a third optical input signal for the third spectrum detector is the received third portion; and the dispersion processor comprises:
  a first divider for determining the first relative power spectrum that is the normalized power spectrum of the received first portion divided by the normalized power spectrum of the received third portion;
  a second divider for determining the second relative power spectrum that is the normalized power spectrum of the received second portion divided by the normalized power spectrum of the received third portion;
  a comparator for providing a comparison of the relative power spectra; and
  a spectrum-dispersion correlator for determining, from the comparison, the dispersion in the optical signal.

12. The dispersion discriminator of claim 11, wherein each spectrum detector comprises:

an optical receiver for receiving the optical input signal by demodulating data from the optical input signal and outputting the demodulated data in an electrical signal;

a scanning band-pass filter for selectively passing, in a filter output signal, a band of frequency components of the electrical signal provided thereto;

a power measuring device for providing a measurement of the total power of the electrical signal;

another power measuring device for providing a measurement of the power of the filter output signal; and a divider for dividing the measurements from the power measuring devices and outputting said signal representing the normalized power spectrum.

13. The dispersion discriminator of claim 12, wherein the third spectrum detector further comprises a delay line between the optical receiver and the scanning band-pass filter for compensating timing delays of the first and second dispersion legs.

14. A dispersion discriminator for determining the amount of dispersion in an amplitude modulated optical signal from two or more portions of the optical signal, the dispersion discriminator comprising:

a first dispersion leg for causing a first additional amount of dispersion in a first portion of the optical signal;

a second dispersion leg for causing a second additional amount of dispersion in a second portion of the optical signal, said first and second additional amounts being opposite in polarity; and a dispersion detector for receiving the first and second portions from the respective dispersion legs, determining the amount of dispersion in the optical signal by detecting a difference between the amount of dispersion in the received first and second portions, and providing an indication of said amount of dispersion in the optical signal.

15. The dispersion discriminator of claim 14, wherein the dispersion detector comprises:

a first spectrum detector for determining the power spectrum of the received first portion;

a second spectrum detector for determining the power spectrum of the received second portion; and a dispersion processor for comparing said power spectra in order to determine said difference.

16. The dispersion discriminator of claim 15, wherein:

each spectrum detector outputs a signal representing a normalized power spectrum of an optical input signal provided thereto;

a first optical input signal for the first spectrum detector is the received first portion and a second optical input signal for the second spectrum detector is the received second portion; and the dispersion processor comprises: a comparator for providing a comparison of said signals representing the normalized power spectrum; and a spectrum-dispersion correlator for determining, from the comparison, the dispersion in the optical signal.

17. The dispersion discriminator of claim 16, wherein the dispersion detector is further operable to receive a third portion of the optical signal and compare the received first portion relative to the received third portion with the received second portion relative to the received third portion in detecting said difference.

18. The dispersion discriminator of claim 17, wherein the dispersion detector further comprises:
- a first spectrum detector for determining the power spectrum of the received first portion;
- a second spectrum detector for determining the power spectrum of the received second portion;
- a third spectrum detector for determining the power spectrum of the received third portion; and
- a dispersion processor being operable to:
  - determine a first relative power spectrum that is the power spectrum of the received first portion relative to the power spectrum of the received third portion;
  - determine a second relative power spectrum that is the power spectrum of the received second portion relative to the power spectrum of the received third portion; and
  - compare said first and second relative power spectra in determining said difference.

19. A dispersion discriminator for determining the polarity and magnitude of dispersion in an amplitude modulated optical signal, the dispersion discriminator comprising:
- an input port for receiving the optical signal;
- an output port for transmitting an output signal indicating the polarity and magnitude of dispersion in the optical signal;
- a splitter having an input coupled to the input port and having at least two outputs, the splitter operable to divide the optical signal into at least first and second portions;
- a positive dispersion leg having two ends, one of which is coupled to one output of the splitter, the positive dispersion leg being operable to add an amount of positive dispersion to the first portion;
- a negative dispersion leg having two ends, one of which is coupled to the other output of the splitter, the negative dispersion leg being operable to add an amount of negative dispersion to the second portion; and
- a dispersion detector having an output coupled to the output port and having two inputs, each input coupled to a respective other end of the positive and negative dispersion legs, the dispersion detector being operable to determine the polarity and magnitude of dispersion in the optical signal by comparing the first and second portions received from the first and second dispersion legs and to transmit an indication of the polarity and magnitude of dispersion in the optical signal via the output signal.

20. The dispersion discriminator of claim 19, wherein the dispersion detector further comprises:
- a first spectrum detector having an input coupled to one of the inputs of the dispersion detector and having an output, the first spectrum detector being operable to provide at its output a normalized power spectrum of an amplitude modulated optical signal provided at its input;
- a second spectrum detector having an input coupled to the other input of the dispersion detector and having an output, the second spectrum detector being operable to provide at its output a normalized power spectrum of an amplitude modulated optical signal provided at its input; and
- a dispersion processor having two inputs, each coupled to the output of a respective one of the spectrum detectors, and having an output coupled to the output of the dispersion detector, the dispersion processor being operable to compare the normalized power spectra and determine said indication of the polarity and magnitude of dispersion.

21. The dispersion discriminator of claim 1, further comprising:
- a wavelength division demultiplexer having an input for a wavelength division multiplexed optical signal consisting of a plurality of optical signals each having a predetermined carrier wavelength, and having a plurality of outputs, each output for outputting a respective optical signal of the wavelength division multiplexed optical signal according to carrier wavelength; and
- an optical switch having an output and a plurality of inputs, each input coupled to a respective output of the wavelength division demultiplexer, the optical switch being operable to selectively couple any one of the plurality of inputs to the output,
- wherein the output of the optical switch is coupled to the splitter, and
- whereby one of the plurality of optical signals is selectable as the amplitude modulated optical signal.

* * * * *